(12) United States Patent
Inoue

(10) Patent No.: US 9,596,434 B2
(45) Date of Patent: Mar. 14, 2017

(54) COMMUNICATION MANAGEMENT SYSTEM, COMMUNICATION SYSTEM, COMMUNICATION TERMINAL, COMMUNICATION MANAGEMENT METHOD, AND RECORDING MEDIUM

(71) Applicant: Takeru Inoue, Kanagawa (JP)

(72) Inventor: Takeru Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/200,606

(22) Filed: Jul. 1, 2016

(65) Prior Publication Data

US 2017/0013234 A1    Jan. 12, 2017

(30) Foreign Application Priority Data

Jul. 7, 2015    (JP) .................. 2015-135926

(51) Int. Cl.
- *H04N 7/14* (2006.01)
- *H04N 7/15* (2006.01)
- *H04L 29/06* (2006.01)

(52) U.S. Cl.
CPC ......... *H04N 7/152* (2013.01); *H04L 65/4038* (2013.01)

(58) Field of Classification Search
USPC ............... 348/14.01, 14.08, 14.11, 14.12
See application file for complete search history.

(56) References Cited

U.S. PATENT DOCUMENTS

| | | | | |
|---|---|---|---|---|
| 8,295,470 | B2* | 10/2012 | Cantero Escola | H04M 3/5191 379/265.09 |
| 9,118,802 | B2* | 8/2015 | Smith | G07C 3/00 |
| 9,118,810 | B1* | 8/2015 | Hopkins, III | H04N 7/141 |
| 2012/0221702 | A1 | 8/2012 | Umehara et al. | |
| 2015/0097917 | A1* | 4/2015 | Gish | H04N 7/141 348/14.04 |

FOREIGN PATENT DOCUMENTS

| | | |
|---|---|---|
| JP | 2005-064860 | 3/2005 |
| JP | 2012-191598 | 10/2012 |

* cited by examiner

*Primary Examiner* — Olisa Anwah
(74) *Attorney, Agent, or Firm* — Oblon, McClelland, Maier & Neustadt, L.L.P.

(57) ABSTRACT

A communication management system starts transmission of first image data captured at a first communication terminal to a second communication terminal through a communication session for display at the second communication terminal, and in response to receiving a communication start request for starting communication with the second communication terminal from the first communication terminal, starts transmission of second image data and second audio data respectively captured at the second communication terminal to the first communication terminal, and first audio data captured at the first communication terminal to the second communication terminal, through the communication session, to enable communication between the first communication terminal and the second communication terminal.

15 Claims, 19 Drawing Sheets

FIG. 7A

AUTHENTICATION MANAGEMENT TABLE

| CONTACT ID | PASSWORD |
|---|---|
| 01aa | aaaa |
| 01ab | abab |
| 01ba | baba |
| ... | ... |

FIG. 7B

TERMINAL MANAGEMENT TABLE

| CONTACT ID | COUNTERPART NAME (TERMINAL NAME) | OPERATING STATE | TERMINAL IP ADDRESS |
|---|---|---|---|
| 01aa | AA TERMINAL | ONLINE (COMMUNICATION OK) | 1.2.1.3 |
| 01ab | AB TERMINAL | ONLINE (COMMUNICATING) | 1.2.1.4 |
| 01ac | AC TERMINAL | OFFLINE | 1.2.1.5 |
| 01da | CALL CENTER/DA TERMINAL | ONLINE (COMMUNICATING) | 1.3.2.3 |
| 01db | CALL CENTER/DB TERMINAL | ONLINE (TALKING) | 1.3.2.4 |
| ... | ... | ... | ... |

FIG. 7C

APPLICATION USE MANAGEMENT TABLE

| APPLICATION ID<br>CONTACT ID | a001 | a002 | a003 | a004 |
|---|---|---|---|---|
| 01aa | ON | ON | ... | ... |
| 01ab | ON | OFF | ... | ... |
| 01ac | ON | ON | ... | ... |
| ... | ... | ... | ... | ... |

FIG. 7D

SESSION MANAGEMENT TABLE

| SESSION ID | RELAY DEVICE ID | PARTICIPATING TERMINAL (OPERATOR) CONTACT ID | PARTICIPATING TERMINAL (CUSTOMER) CONTACT ID |
|---|---|---|---|
| se1 | 111e | 01db | 01aa , 01ab |
| se2 | 111b | 01da | 01ba , 01bb |
| ... | ... | ... | ... |

FIG. 7E

GROUP DATA MANAGEMENT TABLE

| GROUP CONTACT ID | COUNTERPART NAME (GROUP NAME) | MEMBER TERMINAL CONTACT ID |
|---|---|---|
| 01xx | CALL CENTER | 01da, 01db |
| ... | ... | ... |

FIG. 7F

WAITING DATA MANAGEMENT TABLE

| OPERATOR CONTACT ID | WAITING TERMINAL CONTACT ID | RECEIVED TIME/DATE |
|---|---|---|
| 01db | 01aa | 10:30 |
| 01db | 01ac | 10:35 |
| ... | ... | ... |

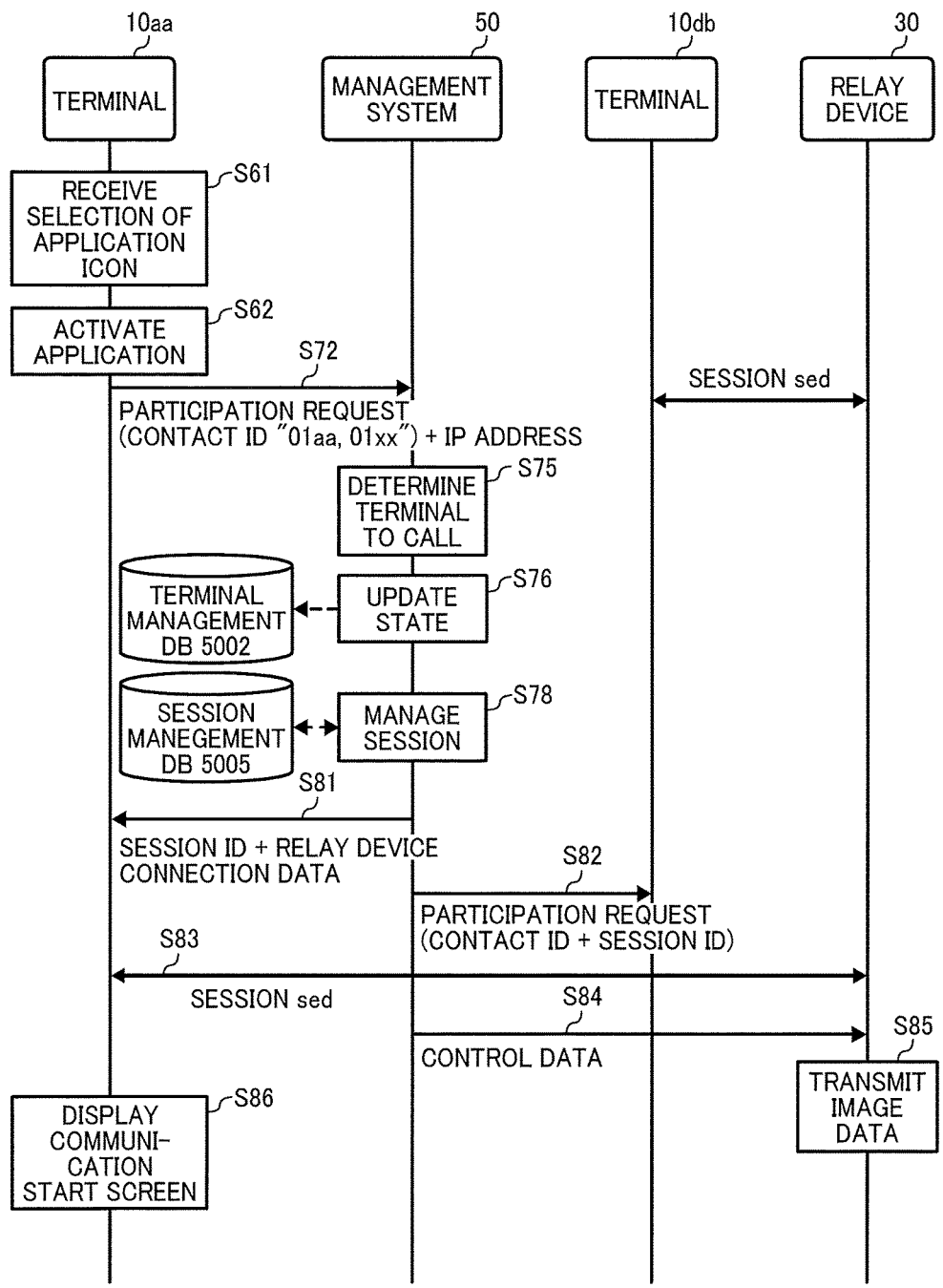

COMMUNICATION MANAGEMENT SYSTEM, COMMUNICATION SYSTEM, COMMUNICATION TERMINAL, COMMUNICATION MANAGEMENT METHOD, AND RECORDING MEDIUM

CROSS-REFERENCE TO RELATED APPLICATIONS

This patent application is based on and claims priority pursuant to 35 U.S.C. §119(a) to Japanese Patent Application No. 2015-135926, filed on Jul. 7, 2015, in the Japan Patent Office, the entire disclosure of which is hereby incorporated by reference herein.

BACKGROUND

Technical Field

The present invention relates to a communication management system, communication system, communication terminal, communication management method, and recording medium.

Description of the Related Art

With the demand for reducing costs and time due to business trips, communication systems are widely used, such as videoconference systems for carrying out communication between communication terminals via a communication network such as the Internet or a dedicated line. When communication is started between the communication terminals, content data such as image data and audio data is transmitted or received between the communication terminals.

The communication systems may be used at the call center. In response to a request for connecting from a customer terminal, a call center management server selects an operator terminal that is available, and establishes a communication session between the operator terminal and the customer terminal to transmit image data and audio data.

SUMMARY

Example embodiments of the present invention include a communication management system, which starts transmission of first image data captured at a first communication terminal to a second communication terminal through a communication session for display at the second communication terminal, and in response to receiving a communication start request for starting communication with the second communication terminal from the first communication terminal, starts transmission of second image data and second audio data respectively captured at the second communication terminal to the first communication terminal, and first audio data captured at the first communication terminal to the second communication terminal, through the communication session, to enable communication between the first communication terminal and the second communication terminal.

Example embodiments of the present invention include a communication terminal, which receives image data captured at a counterpart communication terminal through a communication session, before starting communication with the counterpart communication terminal, and controls a display to display an image based on the received image data. In response to receiving a communication start request for starting communication with the communication terminal from the counterpart communication terminal, the communication terminal additionally receives audio data captured at the counterpart communication terminal through the communication session, while transmitting image data and audio data respectively captured at the communication terminal to the counterpart communication terminal, and controls an output device to output audio based on the audio data, to enable communication with the counterpart communication terminal.

Example embodiments of the present invention include a communication system including the communication management system, and a plurality of communication terminals, a method performed by the communication system, and a method performed by one of the plurality of communication terminals.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A is an illustration of an example data structure of an authentication management table;

FIG. 7B is an illustration of an example data structure of a terminal management table;

FIG. 7C is an illustration of an example data structure of an application use management table;

FIG. 7D is an illustration of an example data structure of a session management table;

FIG. 7E is an illustration of an example data structure of a group data management table;

FIG. 7F is an illustration of an example data structure of a waiting data management table;

FIG. 10 is a data sequence diagram illustrating operation of processing a request for participating in a session, according to an embodiment of the present invention;

Figure 1:
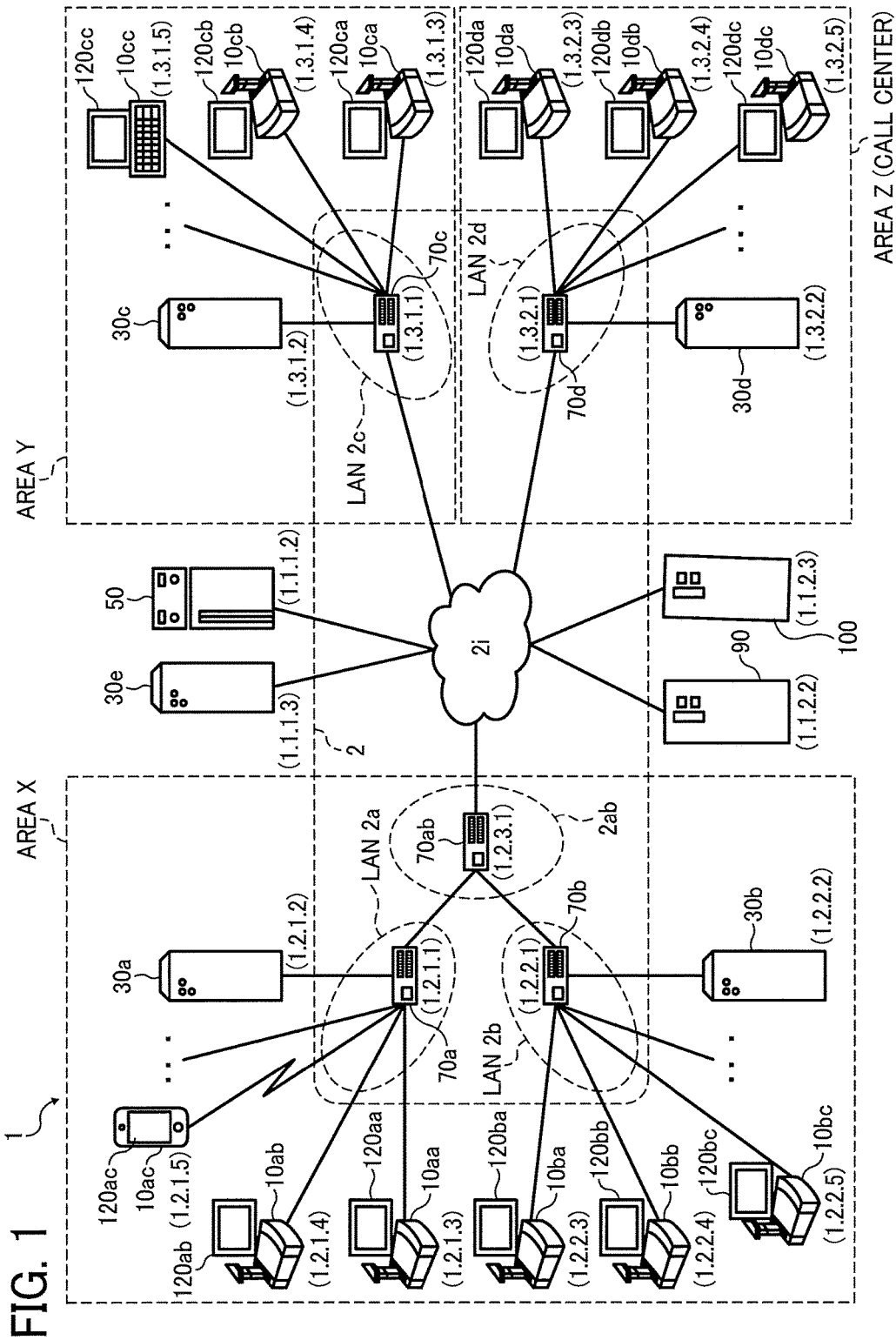
FIG. 1 is a schematic diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to the drawings, some embodiments of the present invention are described. In the following, a "communication terminal" may simply be referred to as a "terminal", and a "communication management system" may simply be referred to as a "management system".

<Configuration of Communication System>

FIG. 1 is a schematic diagram illustrating a configuration of a communication system according to an example embodiment of the present invention. As illustrated in FIG. 1, the communication system 1 includes a plurality of terminals (10aa, 10ab, . . . ), a plurality of displays (120aa, 120ab, . . . ) for respective terminals (10aa, 10ab, . . . ), a plurality of relay devices (30a, 30b, 30c, 30d, 30e), a management system 50, a program providing system 90, and a maintenance system 100. The communication system 1 controls communication of content data, such as image data and audio data, to carry out videoconference among a plurality of remotely located sites. One or more of a plurality of routers (70a, 70b, 70c, 70d, 70ad) is selected to relay content data via an optical route.

The terminals (10aa, 10ab, 10ac, . . . ), the relay device 30a, and the router 70a are connected through a LAN 2a to be communicable with each other. The terminals (10ba, 10bb, 10bc, . . . ), the relay device 30b, and the router 70b are connected through a LAN 2b to be communicable with each other. The LAN 2a and the LAN 2b are connected through a dedicated line 2ab including the router 70ab to be communicable with each other. The LAN 2a, the LAN 2b, and the dedicated line 2ab are provided in an area X. Any one of these devices may be connected directly to the Internet 2i, without using the dedicated line.

The terminals (10ca, 10cb, 10cc, . . . ), the relay device 30c, and the router 70c are connected through a LAN 2c to be communicable with each other. The LAN 2c is provided in an area Y.

The terminals (10da, 10db, 10dc, . . . ), the relay device 30d, and the router 70d are connected through a LAN 2d to be communicable with each other. The LAN 2d is provided in an area Z. The areas X, Y, and Z may be located within one country, or over different countries.

The areas X, Y, and Z are connected through the routers (70ab, 70c, and 70d) to the Internet 2i to be communicable. In this example, the area Z is a location where a call center is provided. In this disclosure, any one of the terminals 10 (10da, 10db, 10dc, . . . ) located at the call center may be referred to as the call center terminal 10d. As described below, the terminal 10 connects with at least one terminal 10d (10da, 10db, 10dc, . . . ) at the call center to have reception services.

In the following, any arbitrary terminal of the plurality of terminals (10aa, 10ab, . . . ) is referred to as the terminal 10. Any arbitrary display of the plurality of displays (120aa, 120ab, . . . ) is referred to as the display 120. Any arbitrary relay device of the relay devices (30a, 30b, 30c, 30d, 30e) is referred to as the relay device 30. Any arbitrary router of the plurality of routers (70a, 70b, 70c, 70d, 70ab) is referred to as the router 70.

The management system 50, the program providing system 90, and the maintenance system 100 are connected to the Internet 2i. The management system 50, the program providing system 90, and the maintenance system 100 may be provided in any of the areas X, Y, and Z, or any area other than the areas X, Y, and Z.

In this example, the communication network 2 includes the LAN (2a, 2b, 2c, 2d), the dedicated line 2ab, and the Internet 2i. The communication network 2 may not only include a wired network, but also a wireless network such as a network in compliance with WiFi (Wireless Fidelity) or Bluetooth, or a mobile phone network.

In FIG. 1, four digits illustrated below each one of the terminals 10, the relay devices 30, the management system 50, the routers 70, the program providing system 90, and the maintenance system 100 indicate a simplified expression of IP address that is assigned to each device capable of functioning as a communication device. For simplicity, the IP address is expressed in Internet Protocol version 4 (IPv4), but the IP address may be expressed in IPv6 instead.

When application is executed, the terminals 10 transmit or receive content data such as image data and audio data, to carry out communication among the users. More specifically, the terminal 10 transmits or receives content data using a predetermined communications protocol. The communications protocol used by the terminal 10 is mainly defined by a call control protocol used for connecting or disconnecting connections with the counterpart terminal, and an encoding format used for encoding the contents data to an IP packet. Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

<Hardware Configuration of Communication System>

Figure 2:
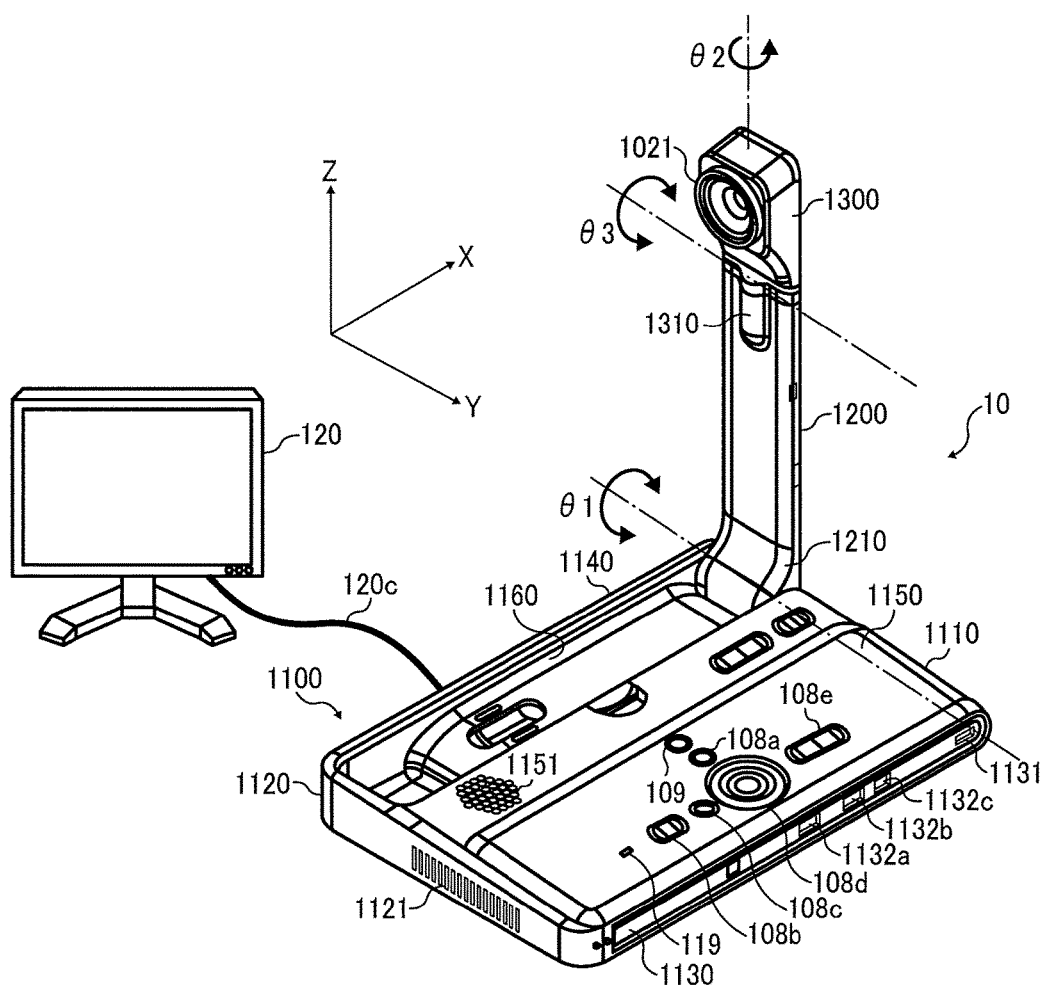
FIG. 2 is an external view illustrating a communication terminal of the communication system of FIG. 1.

Now, a hardware configuration of the communication system 1 is described. FIG. 2 is an external view of the terminal 10 according to an example embodiment of the present invention. As illustrated in FIG. 2, the terminal 10 includes a casing 1100, an arm 120, and a camera housing 1300. The casing 1100 includes a front side wall 1110 having a plurality of air intake holes formed over the nearly entire surface of the intake surface, and a back side wall 1120 having a plurality of exhaust holes over the nearly entire surface of the exhaust surface 1121. When a cooling fan in the casing 1100 is driven, air flows in through the intake holes of the intake surface and out through the exhaust holes of the exhaust surface 1121. The casing 1100 further includes a right side wall 1130 formed with a sound pickup hole 1131. Through the sound pickup hole 1131, a microphone 114 of the terminal 10 is able to catch sounds such as human voice or any sound including noise.

The casing 1100 has an operation panel 1150, which is provided at a front surface toward the right side wall 1130. The operation panel 1150 includes a plurality of operation keys 108a to 108e, a power switch 109, and a plurality of sound output holes 1151. Through the sound output holes 1151, a speaker 115 of the terminal 10 is able to output sounds such as sounds generated based on human voice. The casing 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an external device connection I/F 118. The casing 1100 further includes a left side wall 1140, which is provided with a connection port to connect the external display 120 to the display I/F 117 through a cable 120c.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210. With the torque hinge 1210, the arm 1200 can be rotated in directions of up and down with respect to the casing 1100, while making a tilt angle θ1 of up to 135 degrees. FIG. 2 illustrates the case where the tilt angle θ1 is 90 degrees.

The camera housing 1300 incorporates therein the camera 112 that takes an image of an object. The object may be a part of a user, document, or a room where the terminal 10 is located. The camera housing 1300 is provided with a torque hinge 1310. The camera housing 1300 is attached to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

Note that the external view illustrated in FIG. 2 is only exemplary and the appearance is not restricted thereto. The communication terminal 10 may be, for example, a general-purpose personal computer (PC), a portable phone, a projector, an electronic whiteboard, or a digital signage (See 10ac and 10cc in FIG. 1). When the terminal 10, for example, when implemented by a computer, is not provided with a microphone or a camera, any external microphone or external camera may be connected with the terminal 10. When the terminal 10 is implemented by the PC or the portable phone, the terminal 10 is connected to the Internet 2i through a wireless network such as a wireless LAN or mobile phone network. Further, when the terminal 10 is implemented by PC, such PC may be previously installed with application for enabling the PC to function as the videoconference terminal 10 of FIG. 2 as described below.

Since the communication management system 50, the program providing system 90, and the maintenance system 100 has the same appearance as that of a general server computer, a description of the appearance thereof is omitted.

Figure 3:
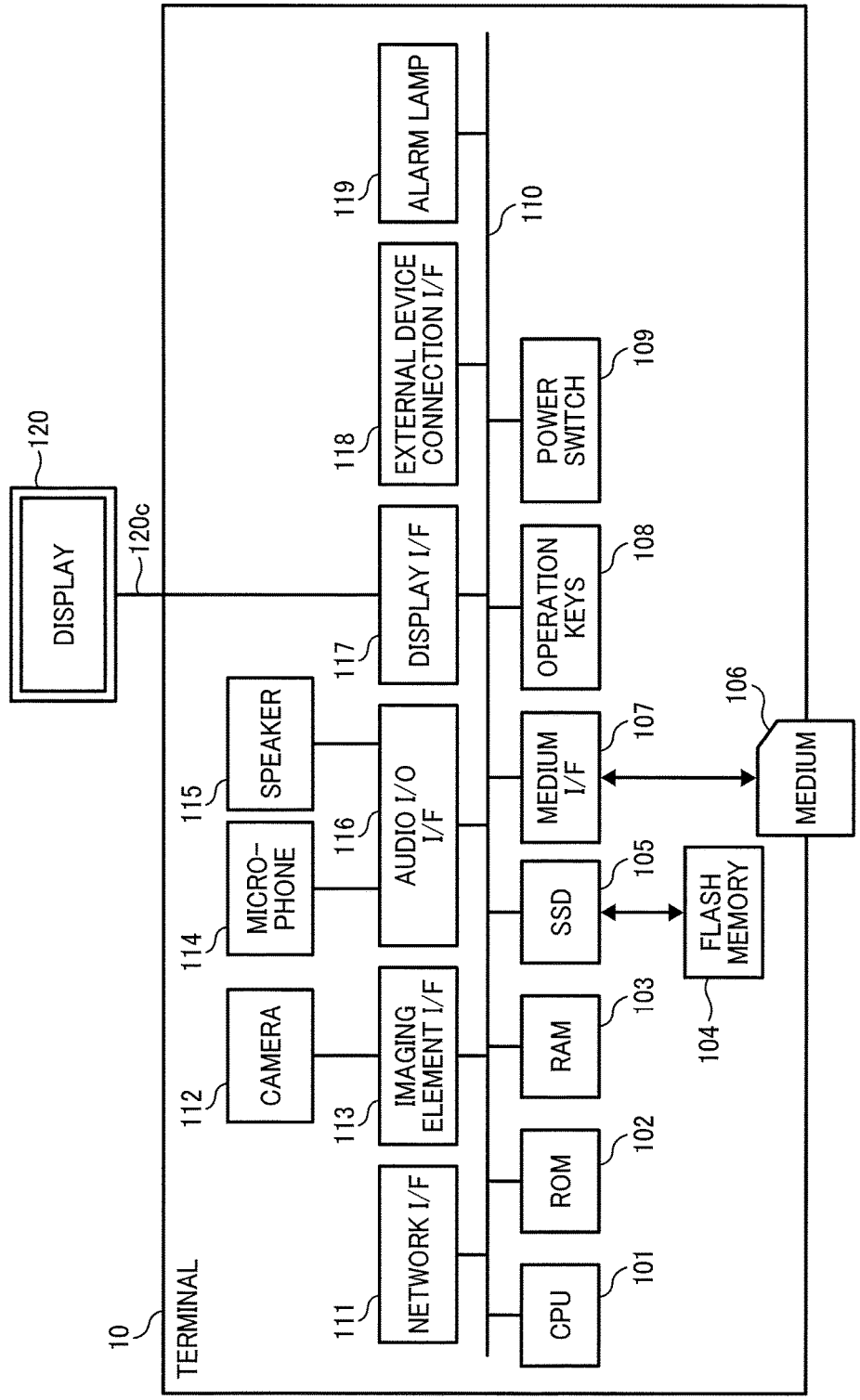
FIG. 3 is a schematic block diagram illustrating a hardware configuration of the communication terminal of FIG. 2.

FIG. 3 illustrates a hardware configuration of the terminal 10 according to the embodiment of the present invention. The terminal 10 includes a central processing unit (CPU) 101 that controls entire operation of the terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 (such as a medium drive) that controls reading/writing (storage) of data from/to a recording medium 106 such as a flash memory or an IC card, the operation keys 108 operated in the case of, for example, selecting a counterpart terminal of the terminal 10, the power switch 109 for turning on/off the power of the terminal 10, and a network interface (I/F) 111 for transmitting data using the communication network 2.

The terminal 10 further includes the built-in camera 112 that captures an image of a subject and obtains image data under control of the CPU 101, an imaging element I/F 113 that controls driving of the camera 112, the built-in microphone 114 that receives a sound input, the built-in speaker 115 that outputs sounds, an audio input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable that is inserted into the connection port 1132 or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the terminal 10. The recording medium 106 can be any non-volatile memory that reads or writes data under control of the CPU 101, such that any memory such as an electrically erasable and programmable read-only memory (EEPROM) may be used instead of the flash memory 104.

Figure 4:
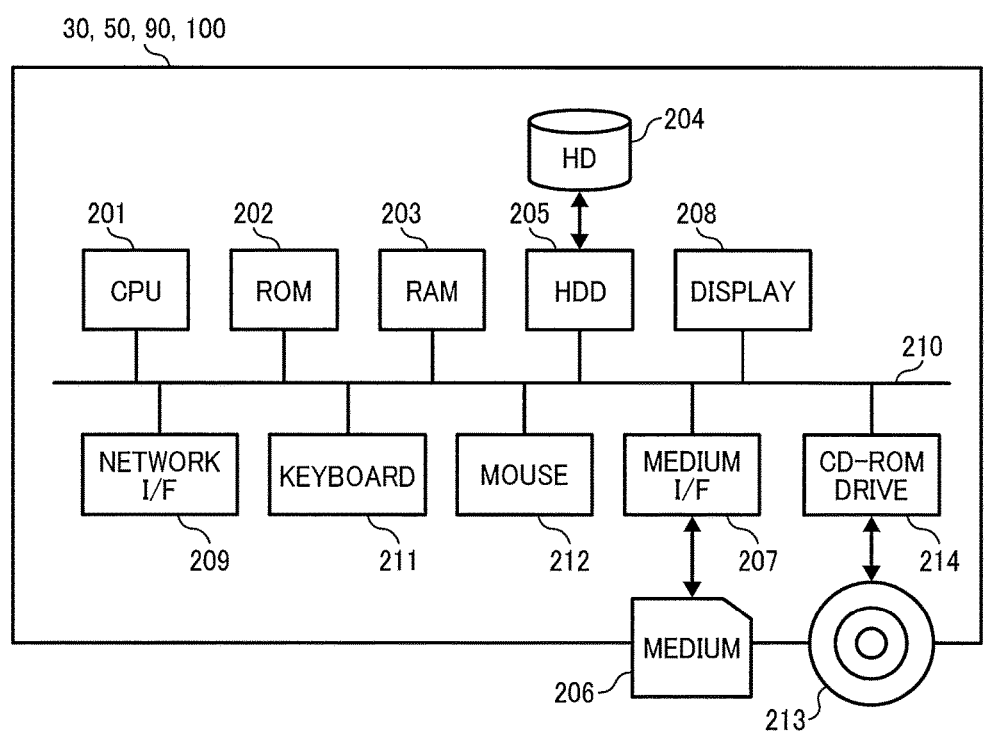
FIG. 4 is a schematic block diagram illustrating a hardware configuration of a communication management system of the communication system of FIG. 1.

FIG. 4 illustrates a hardware configuration of the management system 50 according to the embodiment. The management system 50 includes a CPU 201 that controls entire operation of the management system 50, a ROM 202 that stores a program used for driving the CPU 201 such as an IPL, a RAM 203 used as a work area for the CPU 201, the HD 204 that stores various types of data such as the communication management program, a hard disk drive (HDD) 205 that controls reading/writing of various types of data from/to the HD 204 under control of the CPU 201, a medium I/F 207 (such as a medium drive) that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Since the relay devices 30, the program providing system 90, and the maintenance system 100 each have a hardware configuration that is the same as or similar to that of the above-described management system 50, a description thereof is omitted.

Figure 5:
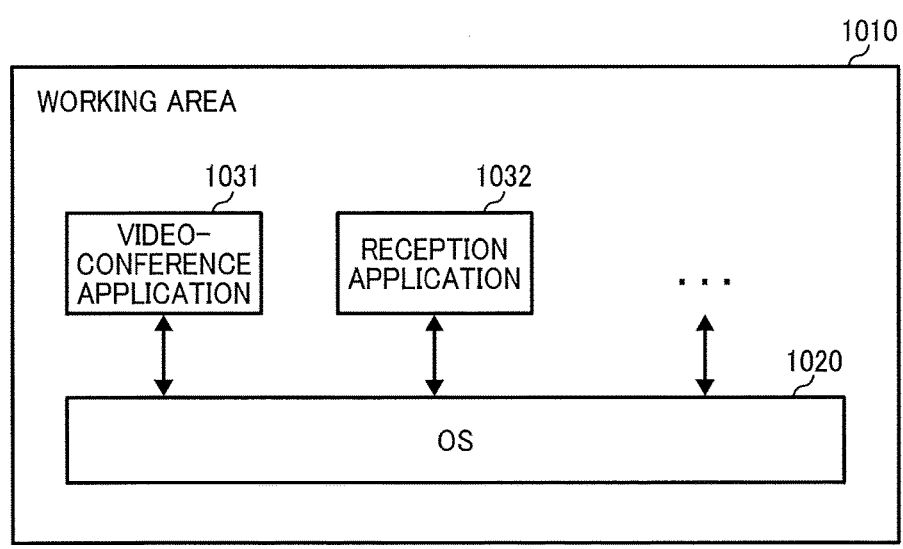
FIG. 5 is a schematic block diagram illustrating a software configuration of the communication terminal of FIG. 1.

FIG. 5 illustrates a software configuration of the terminal 10 according to the embodiment of the present invention. As illustrated in FIG. 5, the terminal 10 is installed with an OS 1020, videoconference application 1031, and reception application 1032, each of which operates on a work area 1010 of the RAM 103.

The OS 1020 is basic software that controls entire operation of the terminal 10 through providing basic functions. The videoconference application 1031 enables the terminal 10 to communicate with the other terminal 10 to carry out videoconference. The reception application 1032 enables the terminal 10 to communicate with the terminal 10*d* at the call center to have conversation (communication) with the operator at the call center.

In alternative to the above-described application, any other application may be installed on the terminal 10. For example, the program providing system 90 may store any desired application in its memory, and upon request from the terminal 10, transfer such application to be downloaded onto the terminal 10. Further, a plurality of types of videoconference application 1031 may be installed, such as application that differs in communications protocol.

<Functional Configuration of Communication System>

Figure 6:
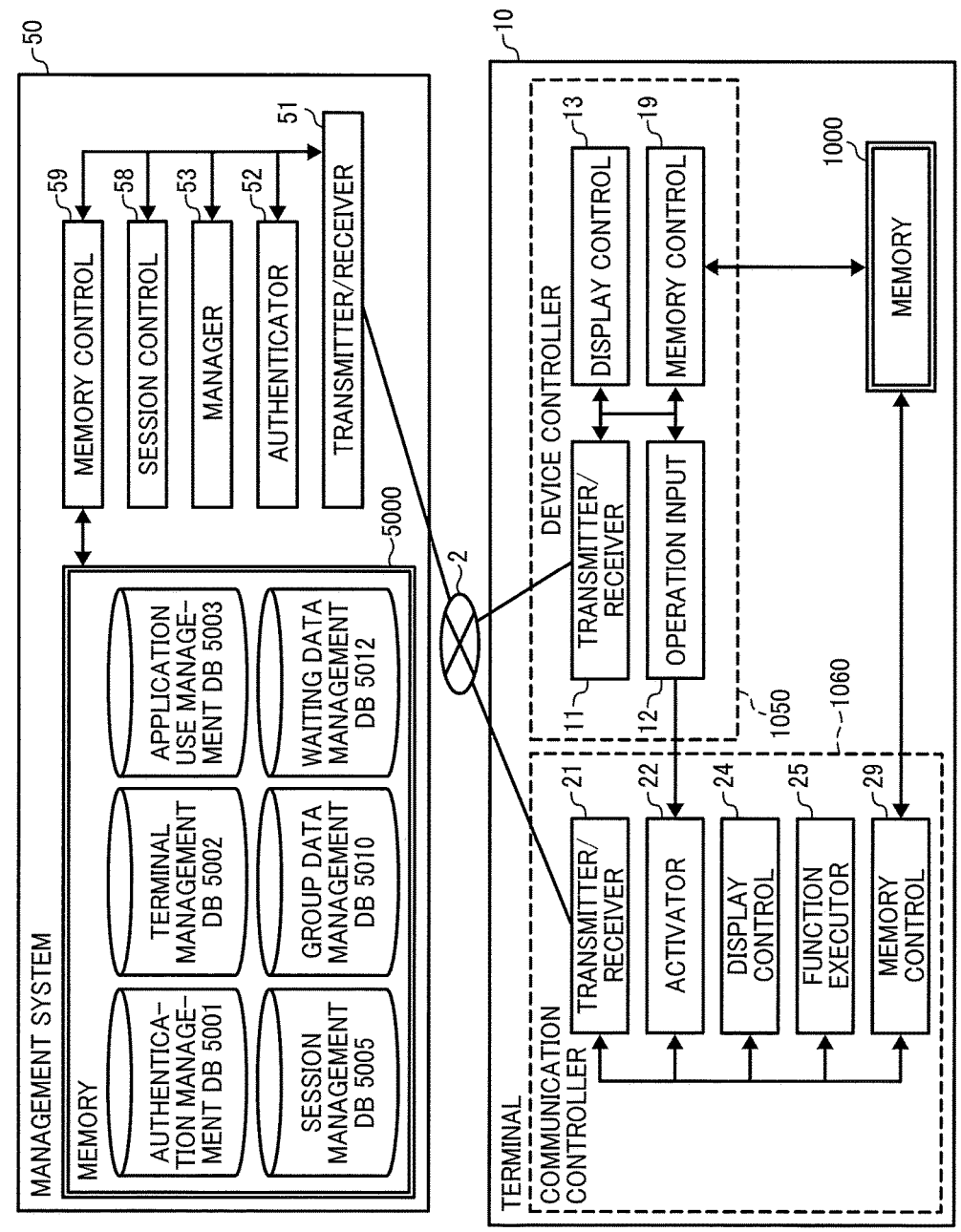
FIG. 6 is a schematic block diagram illustrating a functional configuration of the communication terminal and the communication management system of the communication system of FIG. 1.

Now, functional configuration of the communication system 1 is explained. FIG. 6 is a schematic block diagram illustrating a functional configuration of the terminal 10 and the management system 50 in the communication system 1. In FIG. 6, the terminal 10 and the management system 50 are connected through the Internet 2 to transmit or receive data.

The terminal 10 includes a device controller 1050 and a communication controller 1060. The device controller 1050 is implemented with execution of the OS 1020. The communication controller 1060 is implemented with, for example, execution of the videoconference application 1031 or the reception application 1032.

The device controller 1050 includes a transmitter/receiver 11, an operation input 12, a display control 13, and a memory control 19. These elements in FIG. 6 correspond to a plurality of functions, which are executed according to the instructions of the CPU 101 (FIG. 3) that are generated according to application (such as the executed application) being loaded from the flash memory 104 onto the RAM 103.

The communication controller 1060 includes a transmitter/receiver 21, an activator 22, a display control 24, a function executor 25, and a memory control 29. These elements illustrated in FIG. 6 correspond to a plurality of functions, which are performed by the elements illustrated in FIG. 3 according to the instructions of the CPU 101 (FIG. 3) that are generated according to, for example, the videoconference application 1031 or the reception application 1032 being loaded from the flash memory 104 onto the RAM 103.

The terminal 10 further includes a memory 1000, which is implemented by the ROM 102, RAM 103, or flash memory 104 of FIG. 3.

(Functional Configuration of Device Controller)

Next, functional configuration of the device controller 1050 of the terminal 10 is explained according to the embodiment of the present invention. In the following description of functional configuration of the device controller 1050 of the terminal 10, relationships with hardware elements for implementing the functional configuration of the device controller 1050 illustrated in FIG. 3 is also described.

The transmitter/receiver 11, which is implemented by instructions of the CPU 101 and the network I/F 111, transmits or receives various data (or information) to or from the counterpart terminal, each device or system, through the communication network 2.

The operation input 12, which may be implemented by instructions of the CPU 101, the operation keys (108*a*, 108*b*, 108*c*, 108*d*, 108*e*), and the power switch 109, receives various inputs or selections from the user.

The display control 13, which may be implemented by the instructions of the CPU 101 and the display I/F 117, controls display of an image through the display 120.

The memory control 19, which may be implemented by the instructions of the CPU 101 and the SSD 105, or the instructions of the CPU 101, stores various data in the memory 1000 or reads various data from the memory 1000.

(Functional Configuration of Communication Controller)

Next, functional configuration of the communication controller 1060 of the terminal 10 is explained according to the embodiment of the present invention. In the following description of functional configuration of the communication controller 1060 of the terminal 10, relationships of the hardware elements in FIG. 3 with the functional configuration of the communication controller 1060 in FIG. 6 is also described.

The transmitter/receiver 21, which may be implemented by the instructions of the CPU 101 and the network I/F 111, transmits or receives various data (or information) to or from the counterpart terminal, device, or system, through the communication network 2.

The activator 22, which may be implemented by instructions of the CPU 101, activates the communication controller 1060, in response to an activation request at the operation input 12, when the operation input 12 receives a user selection of application. More specifically, when the user selects activation of the videoconference application 1031, the communication controller 1060 is activated under control of the videoconference application 1031. When the user selects activation of the reception application 1032, the communication controller 1060 is activated under control of the reception application 1032.

The display control 24, which may be implemented by the instructions of the CPU 101 and the display I/F 117, controls transmission of image data to the display 120. Further, the display control 24 controls a user interface for display to the user, according to the selected application such as the videoconference application 1031 or the reception application 1032. The display control 24 is able to control display of information in a manner that matches the user's current needs according to the selected application.

The functional executor 25, which may be implemented by the instructions of the CPU 101, and at least one of the camera 112, microphone 114, and speaker 115, controls communication of image data or sound data.

The memory control 29, which may be implemented by the instructions of the CPU 101 and the SSD 105, or the instructions of the CPU 101, stores various data in the memory 1000 or reads various data from the memory 1000.

<Functional Configuration of Management System>

Referring to FIG. 6, the management system 50 includes a transmitter/receiver 51, an authenticator 52, a manager 53, a session control 58, and a memory control 59. These elements correspond to a plurality of functions of hardware elements in FIG. 4, which operate according to the instructions of the CPU 201 (FIG. 4) that are generated according to the communication management program read from the RAM 203 onto the HD 204. The management system 50 further includes a memory 5000, which may be implemented by the HD 204. The memory 5000 stores, for each application being managed by the management system 50, application ID and application icon data. The memory 5000 further stores a plurality of databases (DBs) as described below.

(Authentication Management Table)

FIG. 7A is an illustration of an example data structure of an authentication management table. The memory 5000 stores an authentication management DB 5001, which may be implemented by the authentication management table of FIG. 7A. In the authentication management table, for each one of the terminals 10 managed by the management system 50, the contact ID and the password are stored in association with each other. The contact ID is any information for identifying a communication destination in the communication system 1. Examples of contact ID include, but not limited to, terminal identification information for identifying the terminal 10 such as the terminal ID, identification information for identifying a user of the terminal 10 such as a user account, and group identification information for identifying a group of terminals 10. In the following, it is assumed that the terminal identification information of the terminal 10, or the group identification information of the group of terminals 10 is used as the contact ID of the terminal 10. Further, in the following, it is assumed that the terminals 10aa, 10ab, 10ac, 10da, and 10db are respectively assigned with the contact Ids "01aa", "01ab", "01ac", "01da", and "01db".

(Terminal Management Table)

FIG. 7B is an illustration of an example data structure of a terminal management table. The memory 5000 stores a terminal management DB 5002, which may be implemented by the terminal management table of FIG. 7B. The terminal management table of FIG. 7B stores, for each terminal 10 being managed by the management system 50, the contact ID of the terminal 10, a counterpart name (terminal name) of the terminal 10 when operating as a destination terminal, an operating state of the terminal 10, and the IP address of the terminal 10, in association with one another. The operating state "offline" indicates that the terminal 10 is not logging in to the management system 50. The operating state "online (communication OK)" indicates that the terminal 10 is logging in to the management system 50, and is not communicating with the other terminal 10. The operating state "online (communicating)" indicates that the terminal 10 is logging in to the management system 50, and is communicating with the other terminal 10, but not transmitting or receiving content data with the counterpart terminal 10. The operating state "online (talking)" indicates that the terminal 10 is logging in to the management system 50, and is communicating with the other terminal 10, while transmitting and receiving content data with the counterpart terminal 10.

(Application Use Permission Management Table)

FIG. 7C is an example data structure of an application use permission management table (application use management table). The memory 5000 stores an application use management DB 5003, which may be implemented by the application use management table of FIG. 7C. The application use management table stores, for the contact ID that identifies each one of the terminals 10 managed by the management system 50, an application ID that identifies each one of a plurality of applications installed on the terminal 10, and use permission information indicating whether use of the application is allowed ("ON") or not allowed ("OFF") by the terminal 10. For example, the application use management table of FIG. 7C indicates that, for each one of the terminals 10aa, 10ab, and 10ac, four applications respectively having the application IDs "a001", "a002", "a003", and "a004" are installed. For the terminal 10aa and the terminal 10ac, use of applications with the application IDs "a001" and "a002" are allowed. For the terminal 10ab, use of application with the application ID "a001" is allowed.

(Session Management Table)

FIG. 7D is an example data structure of a session management table. The memory 5000 also stores a session management DB 5005, which may be implemented by a session management table of FIG. 7D. The session management table stores, for each one of a plurality of content data sessions being managed by the management system 50, the session ID for identifying the session, a relay device ID for identifying the relay device that relays content data between the terminals 10, a contact ID for identifying the operator terminal 10 participating in that session, and a contact ID for identifying the customer terminal 10 participating in the session. The operator terminal 10 is operated by an operator at the call center. The customer terminal 10 is operated by a customer who communicates with the operator, as a communication counterpart.

(Group Data Management Table)

FIG. 7E is an illustration of an example data structure of a group data management table. The memory 5000 stores a group data management DB 5010, which may be implemented by the group data management table of FIG. 7E. The group data management table stores, for each group of terminals, a contact ID for identifying the group, a counterpart name (group name) of the group when the group is a communication destination, and a contact ID for identifying each terminal 10 that belongs to the group, in association with one another. For example, referring to FIG. 7E, the group ID "01xx" is assigned to the group of terminals 10 at the call center, with the contact IDs 01da and 01db.

(Waiting Data Management Table)

FIG. 7F is an illustration of an example data structure of a waiting data management table. The memory 5000 stores a waiting data management DB 5012, which may be implemented by the waiting data management table of FIG. 7F. The waiting data management table stores, for one record, a contact ID for identifying an operator terminal, a contact ID for identifying a customer terminal waiting for communication with the operator terminal, and a received date/time when a communication start request for the operator terminal is received at the management system 50, in association with one another.

<Functional Configuration of Management System>

Next, referring back to FIG. 6, functional configuration of the management system 50 will be described in detail. In the following description of functional configuration of the management system 50, relationships of the elements in FIG. 4 with functional configuration of the management system 50 in FIG. 6 is also described.

The transmitter/receiver 51, which may be implemented by the instructions of the CPU 201 and the network I/F 209, transmits or receives various data (or information) to or from each terminal, device, or system through the communication network 2.

The authenticator 52, which may be implemented by the instructions of the CPU 201, searches the authentication management table (FIG. 7A) using a contact ID and a password received at the transmitter/receiver 51 as a search key, to authenticate the terminal 10 based on determination of whether the same contact ID and password are managed in the authentication management table.

The manager 53, which may be implemented by the instructions of the CPU 201, updates the operating state, etc., in the terminal management table of FIG. 7B to keep updated such as the operating state in the terminal management table of FIG. 7B.

The session control 58, which may be implemented by the instructions of the CPU 201, controls a session to be used for transmitting content data from one terminal 10 to the other terminal 10. Examples of control include, but not limited to, control to establish a session, control to enable the terminal 10 to participate in the established session, control to end the session, and control transmission of content data through the established session.

The memory control 59, which may be implemented by the instructions of the CPU 201 and the HDD 205, or the instructions of the CPU 201, stores various data in the memory 5000 or reads various data from the memory 5000.

<Operation of Communication System>

Now, operation performed by the communication system 1 is explained according to an example embodiment of the present invention.

Figure 8:
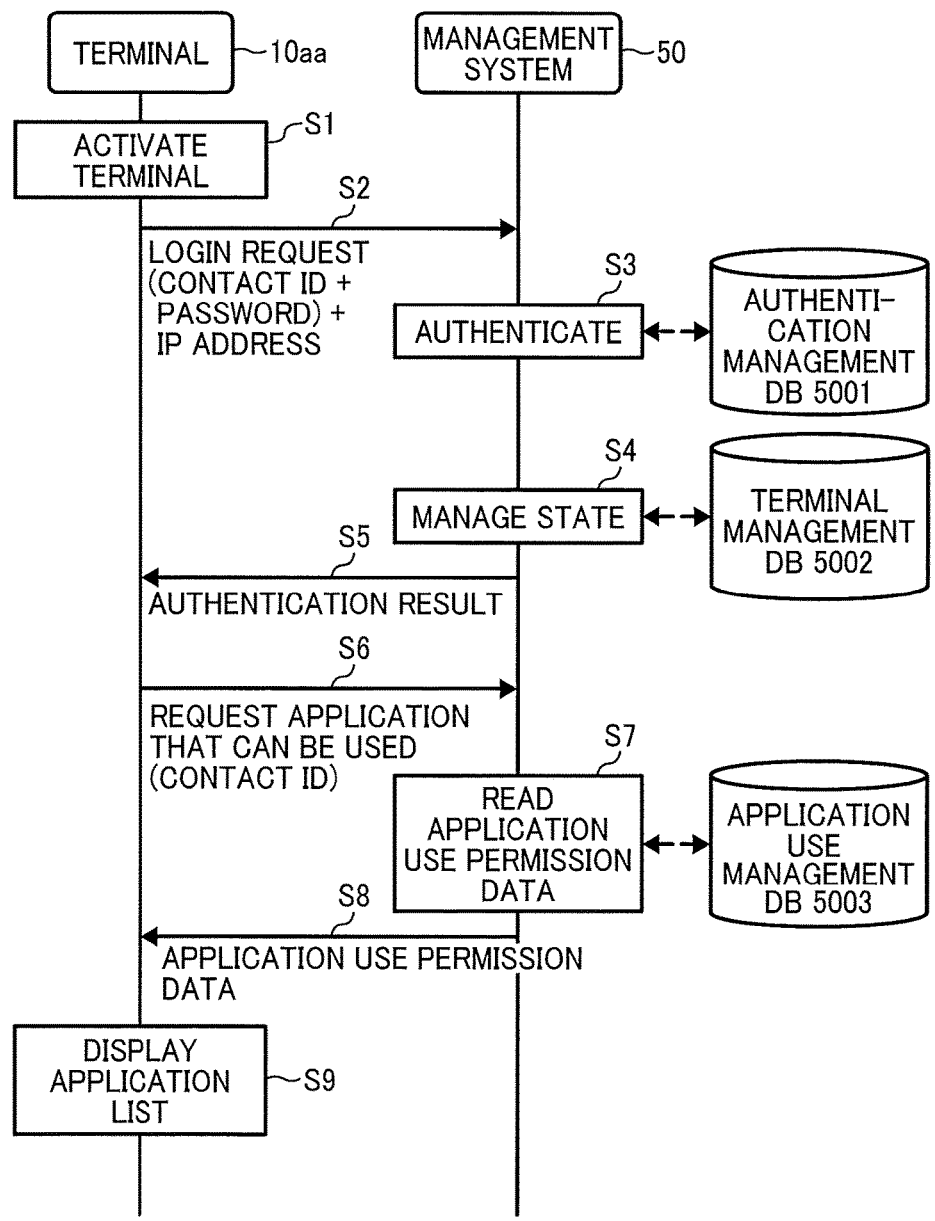
FIG. 8 is a data sequence diagram illustrating operation performed by the communication system 1, from the time when the terminal is activated to the time when the terminal displays an application list.

Referring to FIG. 8, operation from the time when the terminal 10aa is activated, to the time when the terminal 10aa displays an application list, is explained. FIG. 8 is a data sequence diagram illustrating operation performed by the communication system 1, from the time when the terminal 10aa is activated to the time when the terminal 10aa displays an application list.

In response to turning on of the power switch 109 by the user, at S1, the operation input 12 accepts the instruction for turning on, and the terminal 10aa is turned on to be activated. In response to receiving turning on operation, at S2, the transmitter/receiver 11 sends a login request to the management system 50 through the communication network 2. The management system 50 receives the login request at the transmitter/receiver 51. The login request includes a contact ID for identifying the terminal 10aa that sends the login request, and a password. These contact ID and password are read from the memory 1000 by the memory control 19, and transmitted to the transmitter/receiver 11. Alternatively, the contact ID and password may be input by the user through the operation key 108. As the terminal 10aa sends the login request to the management system 50, the management system 50, which is the receiver side, obtains the IP address of the terminal 10aa that is the sender side, which may be transmitted with the login request.

At S3, the authenticator 52 of the management system 50 searches the authentication management table of FIG. 7A using the contact ID and password included in the login request as a search key to authenticate the terminal 10aa based on determination of whether the same contact ID and password are managed in the authentication management table (FIG. 7A). When the authenticator 52 determines that the terminal 10aa that sends the login request is an authenticated terminal, at S4, the manager 53 stores, in the terminal management table of FIG. 7B, the contact ID "01aa" of the terminal 10aa, the operating state ("Online, communication OK"), and the IP address of the terminal 10aa in association with one another.

At S5, the transmitter/receiver 51 of the management system 50 transmits authentication result information indicating an authentication result, obtained by the authenticator 52, to the terminal 10aa that sends the login request through the communication network 2. The terminal 10aa receives the authentication result at the transmitter/receiver 11.

When the authenticator 52 determines that the terminal 10aa that sends the login request is an authenticated terminal, at S6, the transmitter/receiver 11 of the terminal 10aa sends a request for application use permission data to the management system 50 via the communication network 2. The application use permission data indicates one or more applications that can be used by the terminal 10aa. The application use permission data request includes the contact ID of the terminal 10aa, which sends the request. The management system 50 receives the application use permission data request at the transmitter/receiver 51.

At S7, the memory control 59 of the management system 50 searches the application use management table (FIG. 7C) using the contact ID of the terminal 10aa that requests for application use permission data as a search key to obtain the application use permission data for the terminal 10aa. The application use permission data indicates that the application ID "a001" is "ON" (use of application is allowed), and the application ID "a002" is "ON" (use of application is allowed).

At S8, the transmitter/receiver 51 transmits application use permission data, which is read at S7, to the terminal 10aa through the communication network 2. The transmitter/receiver 11 of the terminal 10aa receives the application use permission data at the transmitter/receiver 11.

Figure 9:
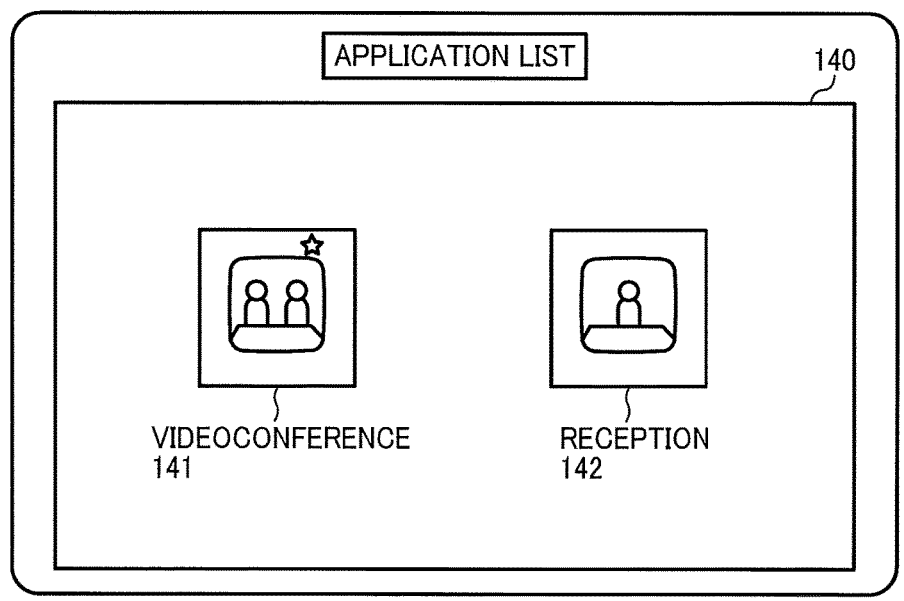
FIG. 9 is an illustration of an example application list screen.

At S9, the display control 13 causes the display 120aa to display a screen (in this example, an application list screen 140), such as that illustrated in FIG. 9. FIG. 9 illustrates an example application list screen. The screen 140 includes, for the respective applications having the application IDs (a001, a002) that are permitted to be used by the terminal 10aa (with the use permission data "ON"), application icons (141, 142) corresponding to the applications that can be used.

Referring to FIG. 10, operation of processing a request for using a service, which is transmitted from a user at the terminal 10aa, is described according to an embodiment of the present invention. In this embodiment, it is assumed that the application icon 142 is selected by the user at the terminal 10aa. FIG. 10 is a data sequence diagram illustrating operation of processing a request for participating in the session.

In response to a selection of the application icon 142 corresponding to the reception application 1032, from among a plurality of application icons on the screen of FIG. 9, at S61, the operation input 12 of the terminal 10 accepts a selection of application icon by the user. In this example, the user may select the application icon 142 using any one of the operation keys (108a to 108e).

At S62, the operation input 12 of the device controller 1050 instructs the activator 22, which operates under control of the reception application 1032, to activate the communication controller 1060 according to the reception application 1032. While the above-described steps up to S62 is performed by the device controller 1050, the following steps after S62 is performed by the communication controller 1060 that is activated under control of the reception application 1032.

At S72, the transmitter/receiver 21 of the terminal 10aa transmits a participation request for requesting to participate in communication with the selected counterpart terminal, to the management system 50. The participation request includes the contact ID "01aa" of the participation requesting terminal 10aa, and the contact ID "01xx". The participation request is transmitted together with the IP address of the participation requesting terminal 10aa. In this example, the transmitter/receiver 21, which operates under control of the reception application 1032, automatically selects the contact ID "01xx", as a contact ID for identifying any terminal at the call center. That is, the participation request to be transmitted is a request for participating in the session that the terminal at the call center is participating.

At S75, the session control 58 of the management system 50 selects, from among the group of terminals 10 identified with the contact ID "01xx", a counterpart terminal 10 to be called to start communication with the terminal 10aa. In this example, the counterpart terminal 10 may be selected using any desired method. For example, the session control 58 may refer to the session management table (FIG. 7D) to select the operator-side participating terminal having the least number of customer-side participating terminals. The example case in which the terminal 10db is selected is described below. Further, in this example, the selected counterpart terminal 10db to be called is participating in the session "sed" via the relay device 30 to transmit or receive content data with the other terminal 10.

At S76, the manager 53 refers to the terminal management table (FIG. 7B) to change the operating state associated with the contact ID "01aa" of the participation requesting terminal 10aa, to "Online (communicating)".

At S78, the session control 58 refers to the session management table (FIG. 7D), to look for a record having the contact ID "01db" of the terminal 10db stored in the "participating terminal (operator) contact ID" field, and add the contact ID "01aa" of the participation requesting terminal 10aa to the corresponding "participating terminal (customer) contact ID" field. The session control 58 searches the session management table (FIG. 7D) using the contact ID "01db" of the selected counterpart terminal 10db as a search key to read the session ID and the relay device ID, which are stored in association with the contact ID "01 db".

At S81, the transmitter/receiver 51 transmits relay device connection data, which is to be used for connecting the relay device 30 that is identified with the relay device ID read at S78, to the participation requesting terminal 10aa. The relay device connection data may include, for example, the IP address of the relay device 30, authentication information to be used for authentication, a port number, and the session ID read at S78.

At S82, the transmitter/receiver 51 of the management system 50 transmits participation request information including the contact ID "01aa" of the participation requesting terminal 10aa, and the session ID read at S78, to the selected counterpart terminal 10db. In response to the participation request, the selected counterpart terminal 10db may automatically transmit a response indicating acceptance of the request to the management system 50. This eliminates a need for the operator to input acceptance, thus simplifying the operation.

The participation requesting terminal 10aa connects with the relay device 30 using the relay device connection data transmitted from the management system 50. At S83, the terminal 10aa participates in the session "sed" that the selected counterpart terminal 10db is participating. As the terminals 10aa and 10db both participate in the same session, communication is established between the terminals 10aa and 10db. The terminals 10aa and 10db, which are both participating in the session, transmit content data (image data and audio data) generated at the local terminal, to the relay device 30.

At S84, the session control 58 of the management system 50 transmits control data including instructions for controlling transmission of content data among the participating terminals, to the relay device 30. More specifically, the control data includes instructions for starting transmission of image data received from the customer terminal 10aa to the operator terminal 10db, instructions for stopping transmission of audio data received from the customer terminal 10aa to the operator terminal 10db, and instructions for stopping transmission of image data and audio data that are received from the operator terminal 10db to the customer terminal 10aa.

Figure 11A:
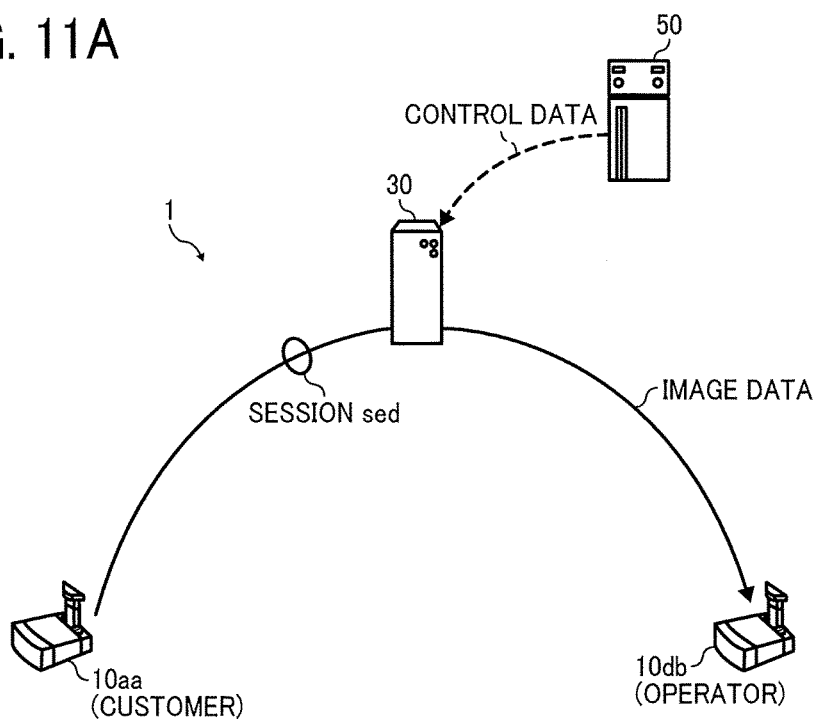
FIGS. 11A and 11B are a conceptual diagram illustrating transmission or reception of various data in the communication system of FIG. 1.

FIG. 11A is a conceptual diagram illustrating transmission or reception of various data in the communication system of FIG. 1. As illustrated in FIG. 11A, at S85, according to the instructions of the control data, the relay device 30 receives image data and audio data transmitted from the customer terminal 10aa, and transmits only the image data to the operator terminal 10db. On the other hand, the relay device 30 receives image data and audio data transmitted from the operator terminal 10*db*, but does not send such data to the customer terminal 10*aa*.

Figure 12:
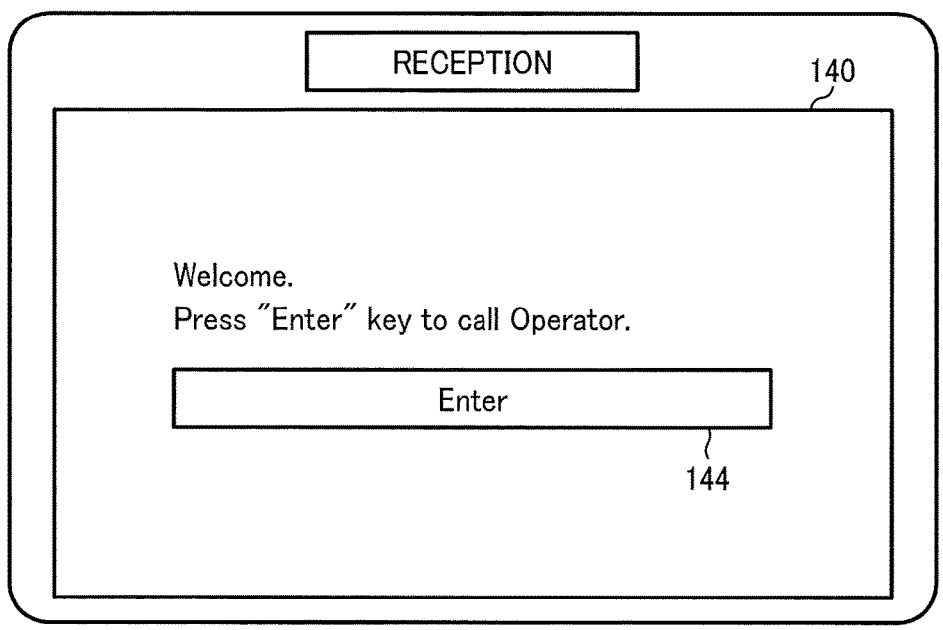
FIG. 12 is an illustration of an example reception screen.

Since the content data from the operator terminal 10*db* is not transmitted to the customer terminal 10*aa*, the operator and the customer cannot start conversation. After starting transmission of content data from the customer terminal 10*aa* to the relay device 30, at S86, the display control 24 of the customer terminal 10*aa* controls the display 120*aa* to display a reception screen that requests for content from the operator. FIG. 12 is an illustration of a screen 140, in this example, an example reception screen. The screen 140 includes the "Enter" key 144, which, when selected, requests to start communication with the operator at the call center.

Figure 11B:
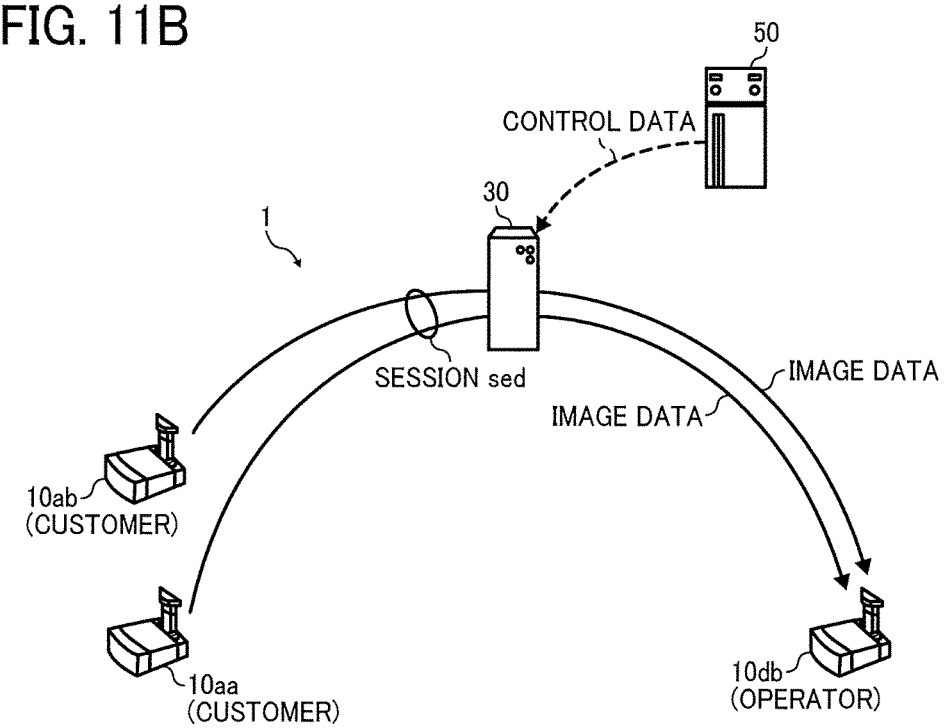

When a participation request is additionally received from the other customer terminal 10, the management system 50 performs operation as described above referring to S75 to S84. That is, three or more communication terminals 10 may participate in the same communication session "sed". FIG. 11B illustrates transmission or reception of various information in the communication system 1, when the terminals 10*aa*, 10*ab*, and 10*db* are participating in the same session "sed". In FIG. 11B, as the terminal 10*aa*, 10*ab*, and 10*db* are participating in the same session "sed", communication is established between the customer terminals 10*aa* and 10*ab*, and the operator terminal 10*db*. In a substantially similar manner as described above referring to S84, the operator terminal 10*db* receives the image data that are received from the customer terminals 10*aa* and 10*ab* via the relay device 30. On the other hand, the customer terminals 10*aa* and 10*ab* do not receive content data transmitted from the terminal 10*db*.

Figure 13:
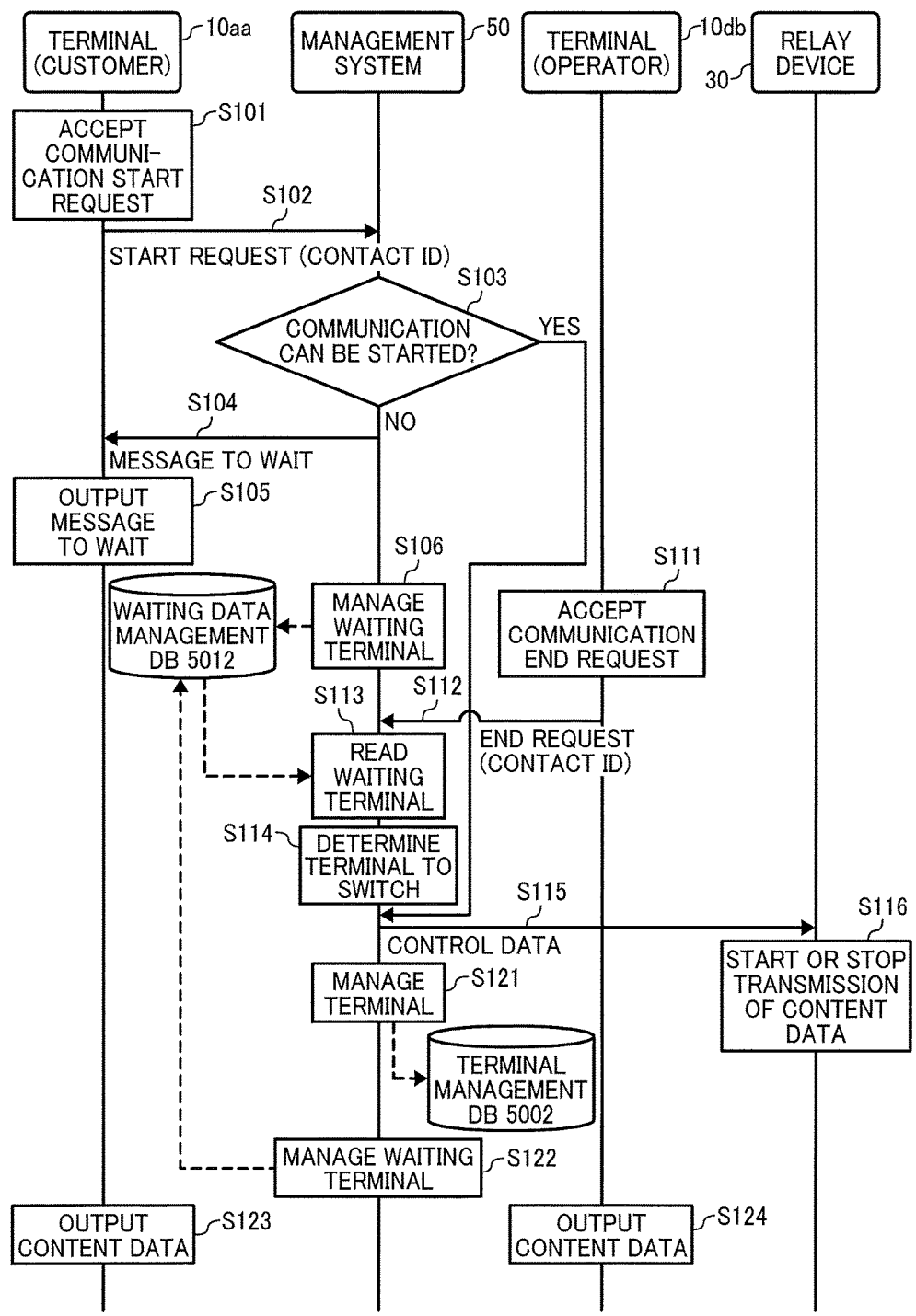
FIG. 13 is a data sequence diagram illustrating operation of processing a request for obtaining content data.

Referring to FIG. 13, operation of processing a request for transmission of content data from the operator terminal 10*db* to the customer terminal 10*aa*, from the customer terminal 10*aa*, is described according to an embodiment of the present invention. FIG. 13 is a data sequence diagram illustrating operation of processing a request for transmission of content data.

As the user, who is a customer, at the terminal 10*aa* presses the key 144 on the reception screen of FIG. 12, at S101, the function executor 25 of the terminal 10*aa* accepts a communication start request.

At S102, the transmitter/receiver 21 of the terminal 10*aa* transmits, to the management system 50, the communication start request including the contact ID "01aa" of the customer terminal 10*aa* as a communication start requester and the contact ID of the operator terminal 10*db* as a communication counterpart. The communication start request may be alternatively referred to as a content data obtaining request, which requests to obtain content data from the operator terminal 10*db*, issued by the customer terminal 10*aa*.

In response to receiving the communication start request at the transmitter/receiver 51 of the management system 50, at S103, the session control 58 determines whether the communication can be started based on the communication start request. More specifically, the session control 58 refers to the operating state, which is stored in association with the contact ID "01db" of the operator terminal 10*db* in the terminal management table (FIG. 7B), and determines to start communication if the operating state indicates "Online (communicating)". When the operating state associated with the contact ID "01db" of the operator terminal 10*db* indicates "Online (talking)", the session control 58 determines that communication cannot be started, as the operator at the operator terminal 10*db* is communicating with the customer at the other terminal through transmitting or receiving content data.

For example, as illustrated in FIGS. 11A and 11B, in case the content data from the operator terminal 10*db* is not transmitted to the customer terminal 10, the terminal management table (FIG. 7B) stores the operating state of the operator terminal 10*db* indicating "Online (communicating) ". In such case, the session control 58 determines that communication can be started ("YES" at S103), and the operation proceeds to S115 without performing S104 to S114.

Figure 14A:
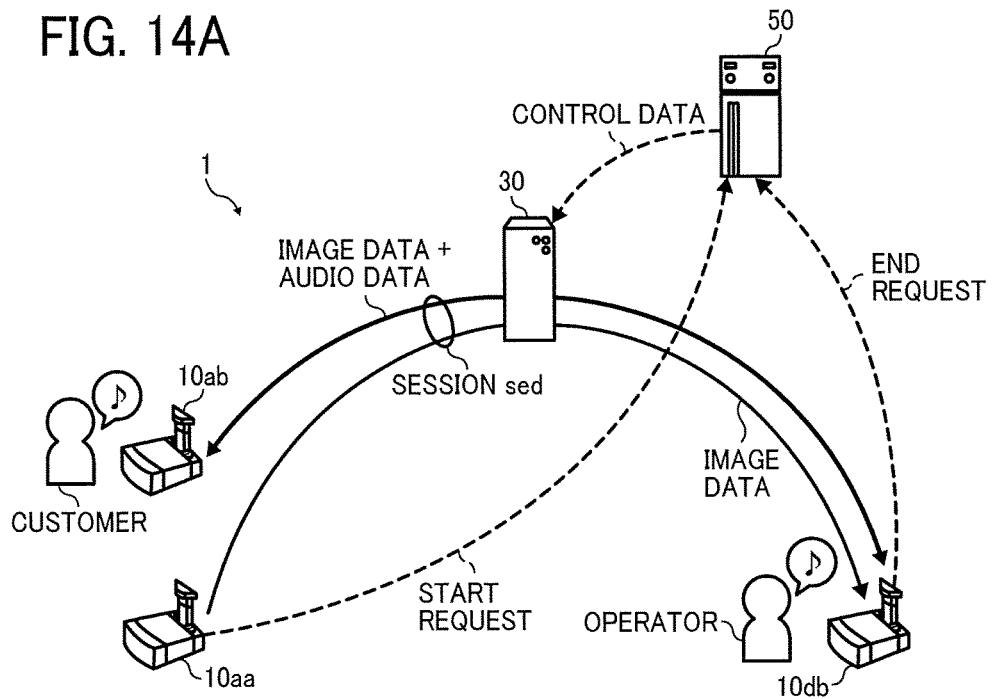
FIGS. 14A and 14B are a conceptual diagram illustrating transmission or reception of various data in the communication system of FIG. 1.

FIG. 14A is a conceptual diagram illustrating transmission or reception of various information in the communication system 1, in the case when the operator terminal 10*db* transmits content data to the customer terminal 10*aa*. In such case, the terminal management table (FIG. 7B) stores the operating state of the operator terminal 10*db* indicating "Online (talking)". Accordingly, the session control 58 determines that communication cannot be started ("NO" at S103), and the operation proceeds to S104.

The following describes an example case in which the session control 58 determines that communication cannot be started.

At S104, the transmitter/receiver 51 transmits, to the customer terminal 10*aa* requesting to start communication, a message requesting to wait to start communication.

As the transmitter/receiver 21 of the terminal 10*aa* receives the message, at S105, the display control 24 causes the display 120*aa* to display a message to wait to start communication.

At S106, the memory control 59 of the management system 50 refers to the waiting data management table (FIG. 7F), to store the contact ID "01aa" of the customer terminal 10*aa* waiting to start communication and the received date/time at which the communication start request is received, in association with the contact ID "01db" of the operator terminal 10*db*.

As the operator terminal 10*db* ends communication with the other customer terminal 10*ab*, at S111, the operation input 12 of the operator terminal 10*db* accepts a request for ending communication with the other customer terminal 10*ab*.

At S112, the transmitter/receiver 21 of the operator terminal 10*db* transmits communication end request information, which requests to end communication, to the management system 50. The communication end request includes the contact ID "01db" of the operator terminal 10*db*, and the contact ID "01ab" of the other customer terminal 10*ab* that the operator terminal 10*db* has been just communicating. The communication end request may be alternatively referred to as a content data transmission end request, which requests to end transmission of content data between the operator terminal 10*db* and the other customer terminal 10*ab*.

As the transmitter/receiver 51 of the management system 50 receives the communication end request, at S113, the memory control 59 searches the waiting data management table (FIG. 7F) using the contact ID of the operator terminal 10*db* requesting to end communication as a search key, to read the contact ID of the customer terminal 10 that has been waiting and the received date/time.

At S114, the session control 58 determines the terminal 10, which will be a communication counterpart for the operator terminal 10*db*, based on the contact ID of the waiting terminal 10 and the received date/time that are read at S113.

In case the terminal IDs of a plurality of waiting terminals are read at S113, the session control 58 selects the waiting terminal 10, which has the earliest received date/time, as a communication counterpart to start communication with the operator terminal 10db. The following describes the example case in which the customer terminal 10aa is selected as a communication counterpart.

At S115, the session control 58 of the management system 50 transmits to the relay device 30, through the transmitter/receiver 51, control data including instructions for controlling transmission of content data among the participating terminals. The control data includes at least four instructions, which are generated based on the communication end request and the communication counterpart that is determined. The first instruction is to stop transmission of content data, such as image data and audio data, from the operator terminal 10db to the customer terminal 10ab that has been communicating. The second instruction is to stop transmission of audio data, of content data transmitted from the customer terminal 10ab that has been communicating, to the operator terminal 10db. The third instruction is to start transmission of content data, such as image data and audio data, from the operator terminal 10db to the customer terminal 10aa to start communication. The fourth instruction is to start transmission of audio data, of content data transmitted from the customer terminal 10aa, to the operator terminal 10db. The third and fourth instructions are to be executed, after execution of the first and second instructions.

At S116, according to the instructions of the control data transmitted from the management system 50, the relay device 30 controls transmission of content data among the terminals 10aa, 10ab, and 10db. More specifically, according to the first instruction, the relay device 30 stops transmission of image data and audio data from the operator terminal 10db, to the customer terminal 10ab. According to the second instruction, the relay device 30 stops transmission of audio data from the customer terminal 10ab to the operator terminal 10db.

At the customer terminal 10ab, which stops receiving image data and audio data transmitted from the operator terminal 10db, the display control 24 causes the display 120ab to display a reception screen for accepting a communication start request, which requests to start communication with the operator. For example, the reception screen of FIG. 12 may be displayed.

Subsequently, according to the third instructions of the control data, the relay device 30 starts transmission of image data and audio data, transmitted from the operator terminal 10db, to the customer terminal 10aa as a communication counterpart. According to the fourth instructions of the control data, the relay device 30 starts transmission of audio data, transmitted from the customer terminal 10aa, to the operator terminal 10db.

Figure 14B:
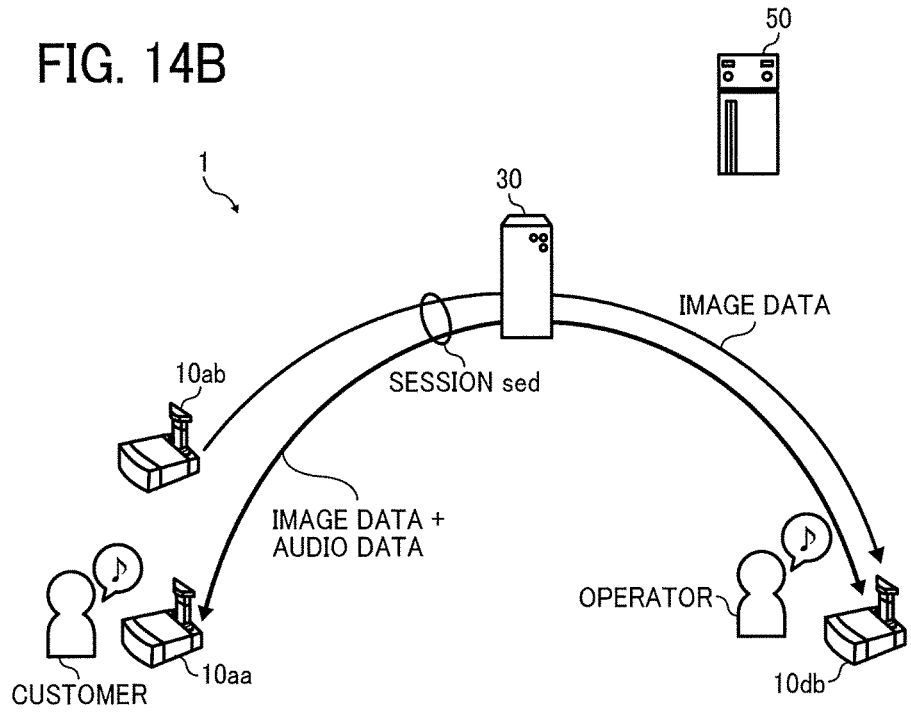

FIG. 14B is a conceptual diagram illustrating transmission or reception of various information in the communication system 1, at the time when S116 is performed. Since image data and audio data are transmitted between the customer terminal 10aa and the operator terminal 10db, the users at both ends can start communication. Further, image data, of content data, transmitted from the customer terminal 10ab, continues to be transmitted to the operator terminal 10db. Based on the image data transmitted from the customer terminal 10ab, the operator at the operator terminal 10db is able to check the customer at the customer terminal 10ab, if necessary.

At S121, the manager 53 of the management system 50 refers to the terminal management table (FIG. 7B), to change the operating state of the customer terminal 10ab that is stored in association with the contact ID "01ab", to "Online (communicating)". Further, the manager 53 refers to the terminal management table (FIG. 7B), to change the operating state of the customer terminal 10aa that is stored in association with the contact ID "01aa", to "Online (talking)".

At S122, the memory control 59 deletes, from the waiting data management table (FIG. 7F), a record including the contact ID "01aa" of the customer terminal 10aa as a communication counterpart.

Figure 15A:
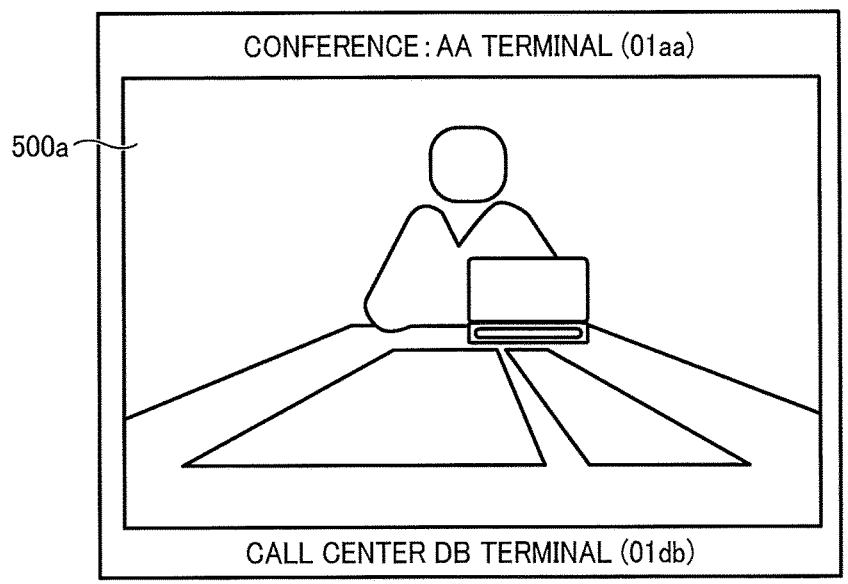
FIGS. 15A and 15B are an illustration of an example videoconference screen.

At the customer terminal 10aa, the transmitter/receiver 21 receives image data and audio data, transmitted from the operator terminal 10db. At S123, the display control 24 of the customer terminal 10aa causes the display 120aa to display a videoconference screen, through outputting an image based on the received image data. The speaker 115 of the customer terminal 10aa outputs audio based on the received audio data. FIG. 15A is an example videoconference screen, which is displayed through the display 120aa of the terminal 10aa. The screen 500a displays an image of the operator at the operator terminal 10db, based on the image data transmitted from the operator terminal 10db.

Figure 15B:
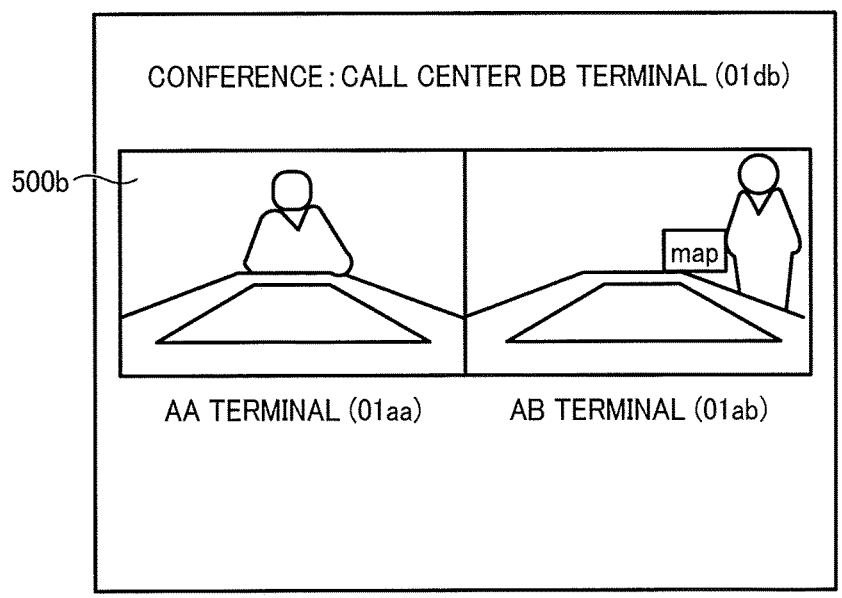

At S124, the display control 24 of the operator terminal 10db causes the display 120db to display an image based on the image data that are respectively received from the customer terminals 10aa and 10ab. The speaker 115 of the operator terminal 10db outputs audio based on the audio data received from the customer terminal 10aa, not based on audio data received from the customer terminal 10ab. FIG. 15B is an example videoconference screen, which is displayed through the display 120db of the terminal 10db. The screen 500b displays an image of the user, who is a customer, at the customer terminal 10aa, based on the image data captured and transmitted from the customer terminal 10aa. The screen 500b further displays an image captured at the customer terminal 10ab, based on the image data captured with the camera 112 and transmitted from the customer terminal 10ab.

That is, when starting communication with the customer at the customer terminal 10aa, the operator at the operator terminal 10db is able to see an image of the customer at the customer terminal 10aa who is talking with the operator, and further see an image captured at the customer terminal 10ab. For example, even when a new customer walks into an image capturing area of the camera 112 of the terminal 10ab, the operator at the operator terminal 10db is able to see an image of the new customer at the terminal 10ab before the new customer requests to start communication through the reception screen.

In another example, in case there is a waiting line to use the terminal 10ab, an image showing the waiting line can be captured for display at the operator terminal 10db, such that the operator is able to instantly know that more customers are waiting.

In another example, in case the captured image of the terminal 10ab displays a customer who carries a map, the operator at the operator terminal 10db may presume that the customer will be asking a way to a particular place.

In another example, in case the captured image of the terminal 10ab displays a customer who carries a brochure in a particular language, the operator at the operator terminal 10db may presume that the customer will be asking some questions in that language.

Through the captured image of the terminal 10ab displaying a customer who will be talking with the operator, the operator at the operator terminal 10db may choose to end the current conversation earlier, or may request the other operator to handle some customers, to prepare for next customers.

At any desired time, the operator at the operator terminal 10db may change a customer terminal to have communication with, for example, from the terminal 10aa to the terminal 10ab, in a substantially similar manner as described above referring to S101 to S124.

Figure 16A:
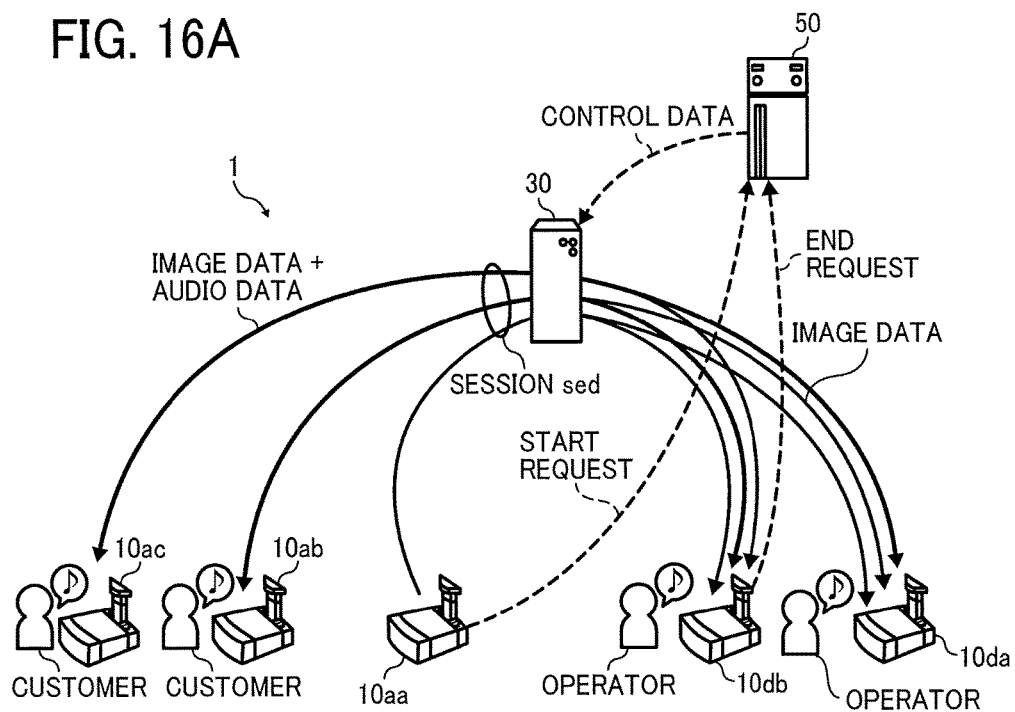
FIGS. 16A and 16B are a conceptual diagram illustrating transmission or reception of various data in the communication system of FIG. 1.
Figure 16B:
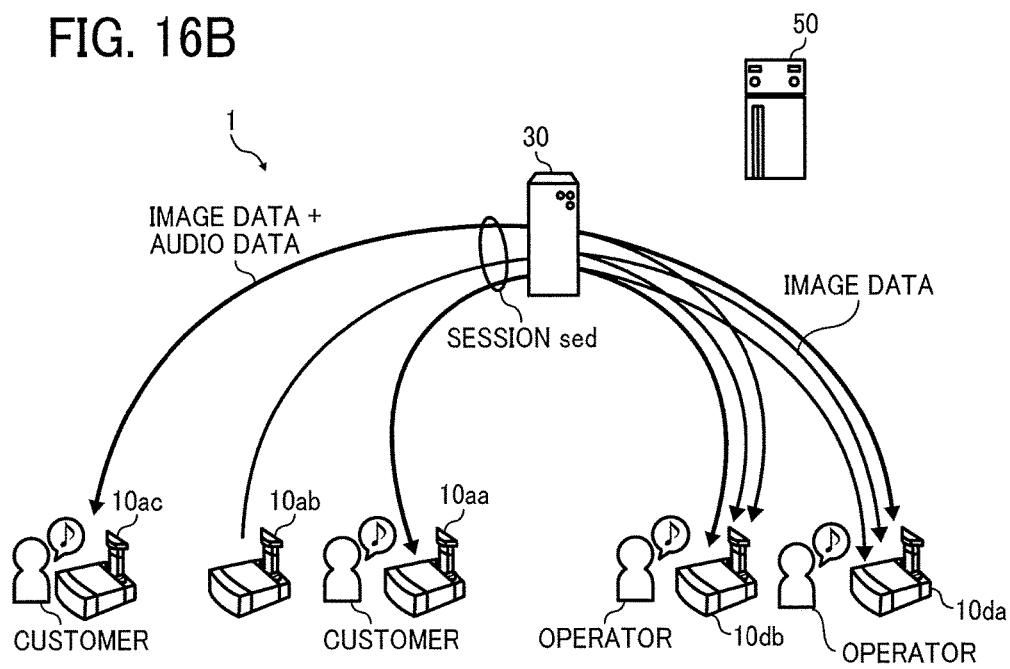
Figure 17:
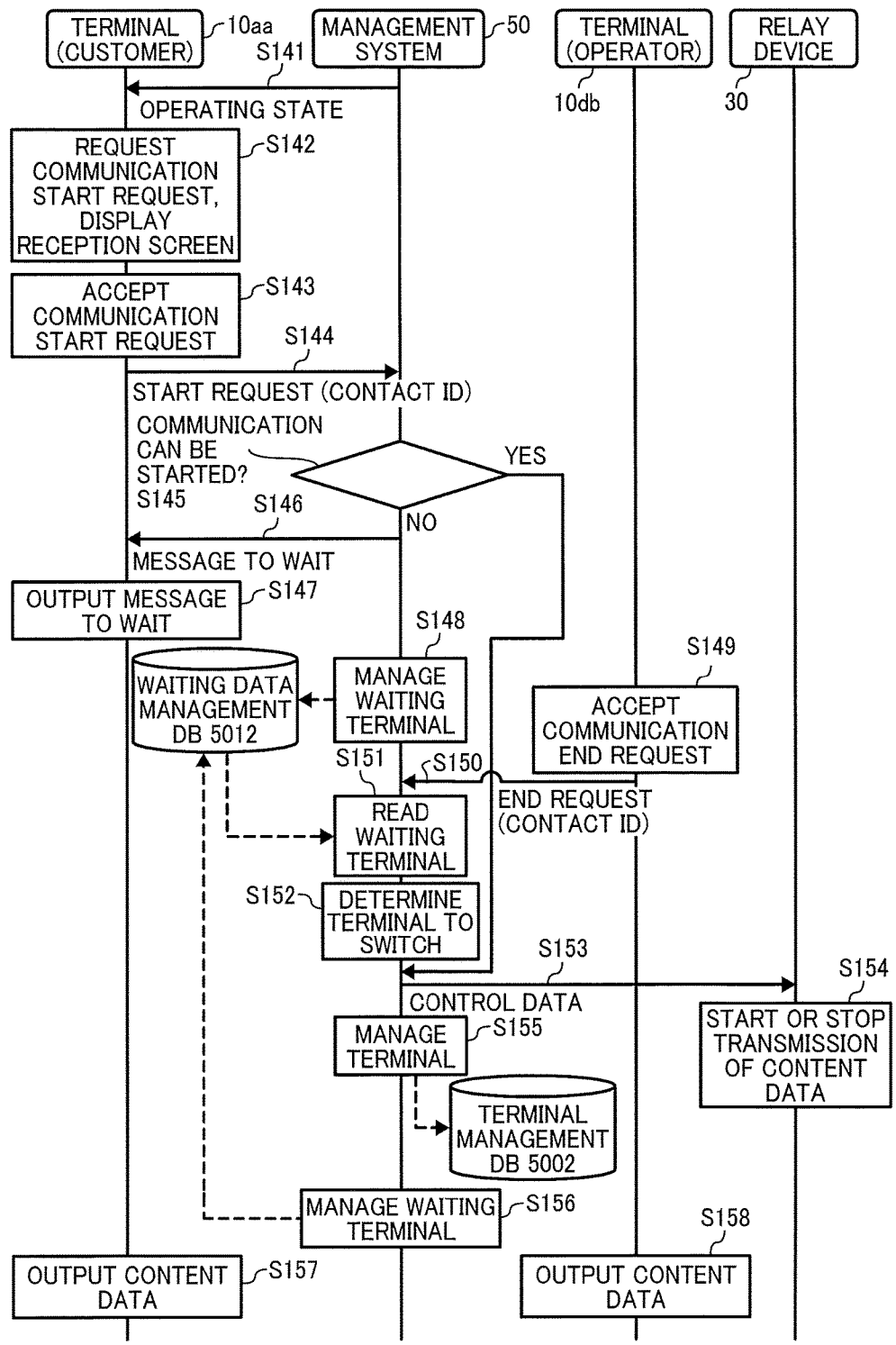
FIG. 17 is a data sequence diagram illustrating operation of processing a request for transmitting content data.
Figure 18:
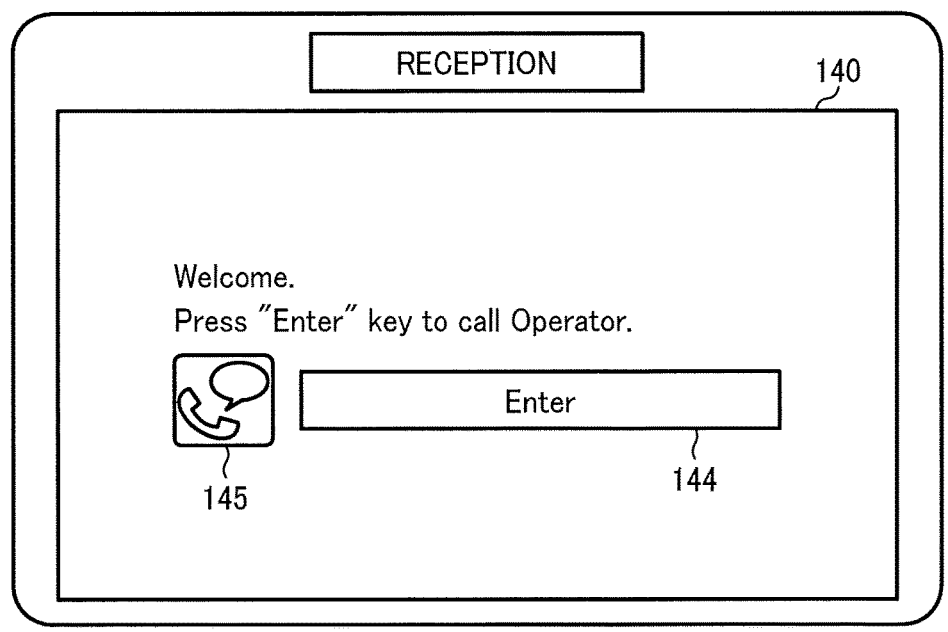
FIG. 18 is an illustration of an example reception screen.

Referring now to FIG. 16 to FIG. 18, operation performed by the communication system 1 is described according to an embodiment of the present invention. In the following embodiment, it is assumed that a plurality of communication terminals are participating in the same session.

Table 1 is a data structure of the session management table, managed by the management system 50, in this embodiment.

| SESSION ID | RELAY DEVICE ID | PARTICIPATING TERMINAL (OPERATOR) CONTACT ID | PARTICIPATING TERMINAL (CUSTOMER) CONTACT ID |
|---|---|---|---|
| se1 | 111e | 01da, 01db | 01aa, 01ab, 01ac |
| ... | ... | ... | ... |

As illustrated in Table 1, in this embodiment, the session control 58 of the management system 50 controls a session, in which a plurality of operator terminals 10 and a plurality of customer terminals 10 communicate with one another through one relay device 30.

FIGS. 16A and 16B each illustrate a conceptual diagram illustrating transmission or reception of various information in the communication system 1, when a plurality of customer terminals and a plurality of operator terminals communicate with one another. As communication is established between the customer terminals 10aa, 10ab, and 10ac, and the operator terminals 10da and 10db, the session control 58 of the management system 50 transmits control data to the relay device 30 to start transmission of image data that are respectively transmitted from the customer terminals 10aa, 10ab, and 10ac, to the operator terminals 10da and 10db. Based on a communication start request from one customer terminal 10 (as a communication start requester), the session control 58 of the management system 50 starts transmission of image data and audio data between the communication start requester terminal 10 and one operator terminal 10.

Referring now to FIGS. 16A and 16B, operation of switching a communication counterpart, from one customer terminal to another customer terminal, is described according to the embodiment.

In FIG. 16A, the management system 50 transmits control data to the relay device 30, such that image data from the customer terminal 10aa is transmitted to the operator terminals 10da and 10db, while the content data from the operator terminals 10da and 10db are not transmitted to the customer terminal 10aa. The management system 50 transmits control data to the relay device 30, such that content data is transmitted between the customer terminal 10ab and the operator terminal 10db, and content data is transmitted between the customer terminal 10ac and the operator terminal 10da. That is, the customer terminal 10aa is waiting to have communication with one of the operator terminals 10da and 10db, while the operator terminal 10da is communicating with the customer terminal 10ac, and the operator terminal 10db is communicating with the customer terminal 10ab.

FIG. 17 is a data sequence diagram illustrating operation of processing a request for transmission of content data, according to the embodiment.

At S141, the memory control 59 of the management system 50 periodically reads out from the terminal management table, the operating state of each terminal 10da and 10db belonging to the group (call center) identified with the contact ID "01xx". If any one of the read operating states indicates "Online (communicating)", the memory control 59 transmits the operating state "Online (communicating)" to the participation requester terminal 10aa as the operating state of the group (call center). If all of the read operating states indicate "Online (talking)", the memory control 59 transmits the operating state "Online (talking)" to the participation requester terminal 10aa as the operating sate of the group (call center).

As the customer terminal 10aa receives the operating state of the call center group, at S142, the display control 24 of the customer terminal 10aa causes the display 120aa to display an icon reflecting the received group operating state on a reception screen, for example, as illustrated in FIG. 18. For example, the reception screen 140 displays an icon 145 reflecting that the operator terminals are all busy, talking with another customer. With this icon 145, the user, who is the customer, at the terminal 10aa can know beforehand that the user needs to wait for some time, even the communication start request is to be transmitted.

At S143, the function executor 25 of the terminal 10aa accepts a communication start request for starting communication with the operator, in response to a use input.

At S144, the transmitter/receiver 21 of the terminal 10aa transmits, to the management system 50, a communication start request including the contact ID "01aa" of the communication start requester terminal 10aa, and the contact ID "01xx" of the call center group as a communication counterpart.

As the management system 50 receives the communication start request at the transmitter/receiver 51, at S145, the session control 58 determines whether communication can be started based on the communication start request. More specifically, the session control 58 refers to the operating states of the respective operator terminals 10da and 10db, stored in association with the contact ID "01xx" of the call center group "01xx", in the terminal management table (similar to FIG. 7B), and determines to start communication if the operating state of any terminal indicates "Online (communicating)". When the operating states associated with the contact ID "01xx" are all "Online (talking)", the session control 58 determines that communication cannot be started, as the operators at all operator terminals (in this case, 10da and 10db) are communicating with the customer at the other terminal through transmitting or receiving content data.

Table 2 illustrates a data structure of the terminal management table in the case of FIG. 16A. Since the operator terminals 10da and 10db both have the operating states "Online (talking)", the session control 58 determines that communication cannot be started ("NO" at S145).

TABLE 2

| CONTACT ID | COUNTERPART NAME (TERMINAL NAME) | OPERATING STATE | TERMINAL IP ADDRESS |
|---|---|---|---|
| 01aa | AA TERMINAL | ONLINE (COMMUNICATING) | 1.2.1.3 |

TABLE 2-continued

| CONTACT ID | COUNTERPART NAME (TERMINAL NAME) | OPERATING STATE | TERMINAL IP ADDRESS |
|---|---|---|---|
| 01ab | AB TERMINAL | ONLINE (TALKING) | 1.2.1.4 |
| 01ac | AC TERMINAL | ONLINE (TALKING) | 1.2.1.5 |
| ... | | | |
| 01da | CALL CENTER: DA TERMINAL | ONLINE (TALKING) | 1.3.2.3 |
| 01db | CALL CENTER: DB TERMINAL | ONLINE (TALKING) | 1.3.2.4 |
| ... | | | |

When it is determined that communication cannot be started ("NO" at S145), at S146, the transmitter/receiver 51 transmits, to the customer terminal 10aa requesting to start communication, a message requesting to wait to start communication.

As the transmitter/receiver 21 of the terminal 10aa receives the message, at S147, the display control 24 causes the display 120aa to display a message to wait to start communication.

At S148, the memory control 59 of the management system 50 refers to the waiting data management table (FIG. 7F), to store the contact ID "01aa" of the customer terminal 10aa waiting to start communication and the received date/time at which the communication start request is received, in association with the contact ID "01xx" of the call center group.

As the operator terminal 10db, which is one of the operator terminals 10da and 10db belonging to the call center group, ends communication with the other customer terminal 10ab, at S149, the operation input 12 of the operator terminal 10db accepts a request for ending communication with the customer terminal 10ab.

At S150, the transmitter/receiver 21 of the operator terminal 10db transmits communication end request information, which requests to end communication, to the management system 50. The communication end request includes the contact ID "01xx" of the call center group to which the operator terminal 10db belongs, and the contact ID "01ab" of the customer terminal 10ab that the operator terminal 10db has been just communicating.

As the transmitter/receiver 51 of the management system 50 receives the communication end request, at S151, the memory control 59 searches the waiting data management table (similar to FIG. 7F) using the contact ID "01xx" of the call center group to which the operator terminal 10db belongs as a search key, to read the contact ID of the customer terminal 10 that has been waiting and the received date/time.

At S152, the session control 58 determines the terminal 10, which will be a communication counterpart for the operator terminal 10db, based on the contact ID of the waiting terminal 10 and the received date/time that are read at S151. The following describes the example case in which the customer terminal 10aa is selected as a communication counterpart.

At S153, the session control 58 of the management system 50 transmits to the relay device 30, through the transmitter/receiver 51, control data including instructions for controlling transmission of content data among the participating terminals. The control data includes at least four instructions, which are generated based on the communication end request and the communication counterpart that is determined. The first instruction is to stop transmission of content data, such as image data and audio data, from the operator terminal 10db to the customer terminal 10ab that has been communicating. The second instruction is to stop transmission of audio data, of content data transmitted from the customer terminal 10ab that has been communicating, to the operator terminal 10db. The third instruction is to start transmission of content data, such as image data and audio data, from the operator terminal 10db to the customer terminal 10aa to start communication. The fourth instruction is to start transmission of audio data, of content data transmitted from the customer terminal 10aa, to the operator terminal 10db. The third and fourth instructions are to be executed, after execution of the first and second instructions.

At S154, according to the instructions of the control data transmitted from the management system 50, the relay device 30 controls transmission of content data among the terminals 10aa, 10ab, and 10db. More specifically, according to the first instruction, the relay device 30 stops transmission of image data and audio data from the operator terminal 10db, to the customer terminal 10ab. According to the second instruction, the relay device 30 stops transmission of audio data from the customer terminal 10ab to the operator terminal 10db.

Subsequently, according to the third instructions of the control data, the relay device 30 starts transmission of image data and audio data, transmitted from the operator terminal 10db, to the customer terminal 10aa as a communication counterpart. According to the fourth instructions of the control data, the relay device 30 starts transmission of audio data, transmitted from the customer terminal 10aa, to the operator terminal 10db.

FIG. 16B is a conceptual diagram illustrating transmission or reception of various information in the communication system 1, at the time when S154 is performed. Since image data and audio data are transmitted between the customer terminal 10aa and the operator terminal 10db, the users at both ends can start communication.

At S155, the manager 53 of the management system 50 refers to the terminal management table (FIG. 7B), to change the operating state of the customer terminal 10ab that is stored in association with the contact ID "01ab", to "Online (communicating)". Further, the manager 53 refers to the terminal management table (FIG. 7B), to change the operating state of the customer terminal 10aa that is stored in association with the contact ID "01aa", to "Online (talking)".

At S156, the memory control 59 deletes, from the waiting data management table (FIG. 7F), a record including the contact ID "01aa" of the customer terminal 10aa as a communication counterpart.

At the customer terminal 10aa, the transmitter/receiver 21 receives image data and audio data, transmitted from the operator terminal 10db. At S157, the display control 24 of the customer terminal 10aa causes the display 120aa to display a videoconference screen, through outputting an image based on the received image data. The speaker 115 of the customer terminal 10aa outputs audio based on the received audio data.

The operator terminal 10db receives image data, which are respectively transmitted from the terminals 10aa, 10ab, and 10ac, through the relay device 30. The operator terminal 10db stops receiving audio data transmitted from the terminal 10ab that has end communication, and starts receiving audio data transmitted from the terminal 10aa that has started communication.

At S158, the display control 24 of the operator terminal 10db causes the display 120db to display images based on the image data that are respectively received from the customer terminals 10aa, 10ab, and 10ac. The speaker 115 of the operator terminal 10db outputs audio based on the audio data received from the customer terminal 10aa, not based on audio data received from the customer terminal 10ab.

According to one or more embodiments described above, the session control 58 of the management system 50 controls a communication established between the customer terminal 10 and the operator terminal 10, to start transmission of content data from the customer terminal 10 to the operator terminal 10. After starting transmission of content data from the customer terminal 10 to the operator terminal 10, the transmitter/receiver 51 of the management system 50 accepts a communication start request from the customer terminal 10. The communication start request is a request for obtaining content data from the operator terminal 10, from the customer terminal 10. Based on the communication start request, the session control 58 of the management system 50 controls to start transmission of content data from the operator terminal 10 to the customer terminal 10.

This enables to start transmission of content data transmitted from the customer terminal 10 to the operator terminal 10, even before the customer terminal 10 requests to start communication with the operator terminal 10. Through the content data received even before the request from the customer terminal 10, the operator at the operator terminal 10 can predict, for example, questions that may be asked by the customer based on information obtainable from such content data.

According to one or more embodiments, the session control 58 of the management system 50 controls a communication established between a plurality of customer terminals 10 and a plurality of customer terminals 10, to start transmission of content data from each customer terminal 10 to the respective operator terminals 10. In response to a communication start request, the session control 58 controls to start transmission of content data from one of the operator terminals 10, to the customer terminal 10 requesting to start communication.

Since the operator terminal that is available for communication can be freely selected, a waiting time for the customer terminal 10 is reduced.

The transmitter/receiver 51 of the management system 50 further accepts a communication end request, which requests to end transmission of content data between the customer terminal 10 and the operator terminal 10. Based on the communication end request, the session control 58 controls, while still keeping transmission of image data from the customer terminal 10 to the operator terminal 10, stops transmission of content data (image data and audio data) from the operator terminal 10 to the customer terminal 10. While stopping two-way communication of content data between the operator terminal 10 and the customer terminal 10, the image captured at the customer terminal 10 continues to be transmitted to the operator terminal 10 to help the operator to check if any new customer is present at the customer terminal 10.

In this embodiment, only image data is transmitted from the customer terminal 10 that has been communicating, to the operator terminal 10. Since transmission of audio data is stopped, the operator at the operator terminal 10 can only hear audio from the customer terminal 10 that is currently communicating to have conversation.

In response to a communication start request from the other customer terminal 10, the session control 58 controls to start transmission of content data from the operator terminal 10, to the customer terminal 10 that sends the communication start request.

Further, based on the communication start request received at the transmitter/receiver 51, the waiting data management DB 5012 of the management system 50 stores the contact ID for identifying the customer terminal 10 that sends the communication start request, until transmission of content data from the operator terminal 10 to the requester customer terminal 10 starts. The session control 58 refers to the waiting data management DB 5012, to determine a terminal 10 to start communication after the current communication ends. Accordingly, the customer terminals 10, which are waiting to start communication, can be managed.

Moreover, the display control 24 of the operator terminal 10 may control content data, which are transmitted respectively from a plurality of customer terminals 10, to be output substantially at the same time. The operator at the operator terminal 10 can then check the customer that the operator is currently talking, and the other customer who is waiting, at once.

In the above-described embodiments, the management system 50 and the program providing system 90 may each be implemented by a single computer, or a plurality of computers each having a set of functions. In addition, any of the programs to be provided to the relay device 30, the management system 50, or the terminal 10 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a CD-ROM storing the terminal control program, the relay device control program, or the communication management program in the above-described embodiment, the HD 204 storing these programs (separately or entirety), and the program providing system 90 including the HD 204 are used as program products in the case of providing the terminal control program, the relay device program, and the communication management program to users within a certain country or outside that country.

In the above-described embodiment, the terminal management table of FIG. 7B stores the terminal IP address, as terminal identification information. Alternatively, the fully qualified domain name (FQDN) of each terminal 10 may be managed as long as an FQDN serves as terminal identification information for identifying each terminal 10 on the communication network 2. In this case, an IP address corresponding to an FQDN is obtained by a Domain Name System (DNS) server. In this case, an IP address corresponding to an FQDN is obtained by a Domain Name System (DNS) server.

In addition, although the case of a videoconference terminal has been described as an example of a communication terminal in the above-described embodiment, the embodiment is not limited to this case, and the communication system 1 may be a car navigation system. In such case, the terminal 10 at one end may correspond to a car navigation system mounted on one automobile, and the terminal 10 at the other end may correspond to a management terminal or a management server at the management center for managing the car navigation system, or a car navigation system mounted on the other automobile.

The communication system 1 may be a teleconference system such as an IP phone system or an Internet phone system. In such case, the terminal 10 may correspond to a phone, such as a mobile phone. Alternatively, the communication system 1 may be a PC screen sharing system.

Further, in some embodiments, when the communication system 1 is used as a remote medical diagnosis system, the content data may be sound data that reflects pulse or beat generated within a human body, image data of electrocardiogram, coordinate data that shows a trend in body temperature, or any other data that may be used to examine the patient.

In addition, although image data and audio data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be streaming data, which may be at least one of image data, audio data, touch data, and smell data.

Note that the terminal 10 may be used not only for communication between different offices or for communication between different rooms in the same office, but also for communication within the same room or for outdoor-indoor communication or outdoor-outdoor communication. In the case where the terminal 10 is used outside, wireless communication using a mobile phone communication network or the like is performed. In addition, although the case in which a videoconference is held by the communication system 1 has been described in the above-described embodiment, the embodiment is not limited to this case. The communication system 1 may be used in meetings, general conversation between family members or friends, or one-way presentation of information.

For example, in alternative to communication between the customer terminal and the operator terminal, the above-described communication system may be used in an example case of communicating between a patient terminal operated by a patient and a doctor terminal operated by a doctor in case of medical system, or between a student terminal operated by a student and a teacher terminal operated by a teacher in case of educational system.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication management system, comprising:
   a network interface to transmit or receive content data through a communication session; and
   circuitry to:
      start transmission of first image data captured at a first communication terminal to a second communication terminal through the communication session for display at the second communication terminal; and
      in response to receiving a communication start request for starting communication with the second communication terminal from the first communication terminal,
      start transmission of second image data and second audio data respectively captured at the second communication terminal to the first communication terminal, and first audio data captured at the first communication terminal to the second communication terminal, through the communication session, to enable communication between the first communication terminal and the second communication terminal.

2. The communication management system of claim 1, wherein
   the network interface further receives a communication end request for ending communication between the first communication terminal and the second communication terminal, and
   the circuitry stops transmission of the second image data and the second audio data to the first communication terminal and transmission of the first audio data to the second communication terminal and transmission of the first audio data to the second communication terminal, while keeping transmission of the first image data to the second communication terminal for display at the second communication terminal.

3. The communication management system of claim 2, wherein the first communication terminal includes a plurality of first communication terminals each capturing first image data to be transmitted to the second communication terminal for display at the second communication terminal, and
   when the network interface receives a communication start request from other first communication terminal different than the first communication terminal that ends communication with the second communication terminal,
   the circuitry starts transmission of the second image data and the second audio data captured at the second communication terminal to the other first communication terminal, after stopping transmission of the second image data and the second audio data to the first communication terminal that ends communication.

4. The communication management system of claim 3, further comprising:
   a memory to store, for each one of the plurality of first communication terminals each capturing first image data to be transmitted to the second communication terminal, identification information for identifying the first communication terminal,
   wherein, in response to receiving the communication end request, the circuitry selects one of the first communication terminals having identification information stored in the memory, as the other first communication terminal to start communication with the second communication terminal.

5. The communication management system of claim 3, wherein the second communication terminal includes a plurality of second communication terminals each receiving the first image data captured at each one of the plurality of first communication terminals, and
   in response to receiving the communication start request from the other first communication terminal, the circuitry selects one of the plurality of second communication terminals as a communication counterpart for the other first communication terminal that sends the communication start request, and
   start transmission of the second image data and the second audio data respectively captured at the selected second communication terminal to the other first communication terminal that sends the communication start request.

6. A communication system comprising:
the communication management system of claim 1; and
the second communication terminal to control a display to display an image based on the first image data captured at the first communication terminal before starting communication with the first communication terminal, and additionally control an output device to output audio based on the first audio data captured at the first communication terminal in response to receiving the communication start request to enable communication between the first communication terminal and the second communication terminal.

7. The communication system of claim 6, wherein the first communication terminal includes a plurality of first communication terminals, and
the second communication terminal controls the display to display on a same screen a plurality of images based on first image data respectively received from the plurality of first communication terminals.

8. The communication system of claim 6, wherein the communication management system includes:
a communication management server to generate control data; and
a relay device to control transmission of content data between the first communication terminal and the second communication terminal according to the control data generated at the communication management server.

9. A communication terminal to communicate with one or more counterpart communication terminals, comprising:
a network interface to receive image data captured at the counterpart communication terminal through a communication session, before starting communication with the counterpart communication terminal; and
circuitry to control a display to display an image based on the received image data,
wherein, in response to receiving a communication start request for starting communication with the communication terminal from the counterpart communication terminal,
the network interface additionally receives audio data captured at the counterpart communication terminal through the communication session, while transmitting image data and audio data respectively captured at the communication terminal to the counterpart communication terminal, and
the circuitry controls an output device to output audio based on the audio data, to enable communication with the counterpart communication terminal.

10. The communication terminal of claim 9, wherein the counterpart communication terminal includes a plurality of counterpart communication terminals, and
the circuitry controls the display to display on a same screen a plurality of images based on image data respectively received from the plurality of counterpart communication terminals.

11. A method of controlling transmission of content data through a communication session, comprising:
starting transmission of first image data captured at a first communication terminal to a second communication terminal through the communication session for display at the second communication terminal; and
in response to receiving a communication start request for starting communication with the second communication terminal from the first communication terminal, starting transmission of second image data and second audio data respectively captured at the second communication terminal to the first communication terminal, and transmission of first audio data captured at the first communication terminal to the second communication terminal, through the communication session, to enable communication between the first communication terminal and the second communication terminal.

12. The method of claim 11, further comprising:
receiving a communication end request for ending communication between the first communication terminal and the second communication terminal, and
stopping transmission of the second image data and the second audio data to the first communication terminal and transmission of the first audio data to the second communication terminal and transmission of the first audio data to the second communication terminal, while keeping transmission of the first image data to the second communication terminal for display at the second communication terminal.

13. The method of claim 12, wherein the first communication terminal includes a plurality of first communication terminals each capturing first image data to be transmitted to the second communication terminal for display at the second communication terminal, the method further comprising:
receiving a communication start request from other first communication terminal different than the first communication terminal that ends communication with the second communication terminal; and
starting transmission of the second image data and the second audio data captured at the second communication terminal to the other first communication terminal, after stopping transmission of the second image data and the second audio data to the first communication terminal that ends communication.

14. The method of claim 13, further comprising:
storing in a memory, for each one of the plurality of first communication terminals each capturing first image data to be transmitted to the second communication terminal, identification information for identifying the first communication terminal; and
in response to receiving the communication end request, selecting one of the first communication terminals having identification information stored in the memory, as the other first communication terminal to start communication with the second communication terminal.

15. The method of claim 13, wherein the second communication terminal includes a plurality of second communication terminals each receiving the first image data captured at each one of the plurality of first communication terminals, the method further comprising:
in response to receiving the communication start request from the other first communication terminal, selecting one of the plurality of second communication terminals as a communication counterpart for the other first communication terminal that sends the communication start request; and
starting transmission of the second image data and the second audio data respectively captured at the selected second communication terminal to the other first communication terminal that sends the communication start request.

* * * * *